United States Patent
Harada et al.

(10) Patent No.: US 8,035,587 B2
(45) Date of Patent: Oct. 11, 2011

(54) METHOD APPARATUS FOR DRIVING LIQUID CRYSTAL DEVICE AND APPARATUS FOR DRIVING LIQUID CRYSTAL DEVICE

(75) Inventors: Haruo Harada, Kanagawa (JP); Hiroshi Arisawa, Kanagawa (JP); Yasunori Okano, Kanagawa (JP); Makoto Gomyo, Kanagawa (JP); Taijyu Gan, Kanagawa (JP); Masahiro Sato, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1074 days.

(21) Appl. No.: 11/598,111

(22) Filed: Nov. 13, 2006

(65) Prior Publication Data

US 2007/0268416 A1    Nov. 22, 2007

(30) Foreign Application Priority Data

May 1, 2006   (JP) .............................. P2006-127530

(51) Int. Cl.
   *G09G 3/36*     (2006.01)
(52) U.S. Cl. ................. 345/87; 345/89; 345/90; 345/95; 345/98; 345/99
(58) Field of Classification Search ............... 345/55, 345/87, 89, 95, 98, 99, 204, 209, 213, 507, 345/76, 90, 94; 349/2, 74, 168, 169, 175–177, 349/185, 33–35; 252/299.01; 428/1.1, 1.3; 347/130

See application file for complete search history.

(56) References Cited

U.S. PATENT DOCUMENTS

| | | | | |
|---|---|---|---|---|
| 4,392,719 | A  * | 7/1983 | Sekimoto ......................... 349/2 |
| 5,933,203 | A  * | 8/1999 | Wu et al. ......................... 349/35 |
| 6,052,103 | A  * | 4/2000 | Fujiwara et al. ................ 345/89 |
| 6,268,840 | B1 * | 7/2001 | Huang ............................ 345/94 |
| 6,852,375 | B2 * | 2/2005 | Kobayashi et al. ............ 428/1.3 |
| 7,473,447 | B2 * | 1/2009 | Izumi ............................. 428/1.1 |
| 2003/0058543 | A1 * | 3/2003 | Sheedy et al. ................ 359/630 |
| 2003/0085862 | A1 * | 5/2003 | Tsutsui .......................... 345/90 |
| 2003/0085863 | A1 * | 5/2003 | Ma ................................. 345/97 |
| 2003/0112400 | A1 * | 6/2003 | Izumi et al. ................... 349/141 |
| 2003/0128305 | A1 * | 7/2003 | Izumi et al. ..................... 349/37 |

(Continued)

FOREIGN PATENT DOCUMENTS

JP     A 11-237644    8/1999

(Continued)

*Primary Examiner* — Prabodh Dharia
(74) *Attorney, Agent, or Firm* — Oliff & Berridge, PLC

(57) ABSTRACT

A method for driving a liquid crystal device to record an image on the liquid crystal device is provided. The liquid crystal device has: a pair of electrodes; and a liquid crystal layer of cholestric liquid crystal sandwiched between the pair of electrodes. The method includes: applying a voltage V1 higher than a threshold value of a phase change to the homeotropic phase to make the liquid crystal layer to be in a homeotoropic phase; applying selectively two voltages V2H and V2L higher than the voltage V1 to each portion of the liquid crystal layer; and applying a voltage V3 under a condition of such a magnification and application time that a portion to which the voltage V2H has been applied changes to a planar phase and a portion to which the voltage V2L has been applied changes to a focal conic phase.

15 Claims, 15 Drawing Sheets

U.S. PATENT DOCUMENTS

| | | | |
|---|---|---|---|
| 2003/0183805 A1* | 10/2003 | Kobayashi et al. | 252/299.01 |
| 2005/0162500 A1* | 7/2005 | Nose et al. | 347/118 |
| 2005/0218376 A1* | 10/2005 | Izumi | 252/299.01 |
| 2006/0125739 A1* | 6/2006 | Tsutsui | 345/76 |
| 2007/0008262 A1* | 1/2007 | Harada et al. | 345/87 |
| 2009/0231501 A1* | 9/2009 | Harada et al. | 349/25 |

FOREIGN PATENT DOCUMENTS

| | | |
|---|---|---|
| JP | A 2001-228459 | 8/2001 |
| WO | WO 98/50804 | 11/1998 |

* cited by examiner $S = (1/2)\langle 3\cos 2\theta - 1\rangle$

θ : DEVIATION OR LONG AXIS OF LIQUID CRYSTAL MOLECULE WITH RESPECT TO MACROSCOPIC PRIORITY DIRECTION

< > : WHOLE SPATIAL AVERAGE

PLANAR

FOCAL CONIC

HOMEOTROPIC

METHOD APPARATUS FOR DRIVING LIQUID CRYSTAL DEVICE AND APPARATUS FOR DRIVING LIQUID CRYSTAL DEVICE

BACKGROUND (i) Technical Field

The present invention relates to a driving method of writing an image on a liquid crystal device, and an apparatus for driving the liquid crystal device.

(ii) Background Art

For a reason, such as earth environment preservation such as forest resources protection, or office environment improvements called "space save", an expectation for a rewritable marking technique as a hard copy technology shifting to paper is high.

Hard copy of paper has excellent convenience, which does not belong to a conventional electronic display, such as (1) it provides bright and high-contrast reflective full-color display, convenient reading, and a high information display density, (2) it has a light, thin and flexible structure, can be seen at a comfortable posture, and provides a wide selection range of irradiation conditions, (3) it has a memory characteristic in display, can provide information display and retention with no power, and enables less eye fatigue through flickless display, and (4) it can provide easy look through simultaneous display of plural sheets at low cost, and convenient comparison and browsing of information, and so on.

For this reason, the paperlessness of office has not been accelerated, as expected, resulting in a behavior in which information displayed on an electronic display is printed on paper as a hard copy and is read. Therefore, a display medium replacing paper requires the reappearance of various convenience unique to the above paper document in addition to a rewriting function for realizing resource saving and waste saving.

Research has been done on a variety of rewritable marking techniques with further improved convenience. As one direction, a technique by a liquid crystal device in which liquid crystal and an optical conductor are stacked enables repetitive writing/erase to be implemented, and has been in the spotlight as realizing other excellent characteristics.

The introduction of this technique will be described below. A planar phase represented by cholesteric liquid crystal (chiral nematic liquid crystal) induces a selective reflection phenomenon in which in a state where incident light parallel to screw axes is divided into right linear light and left linear light, the screws interfere and reflect a circular polarization component parallel to a twist direction and permit transmission of the remaining light. A center wavelength $\lambda$ and a reflection wavelength width a of reflected light has a relationship of $\lambda = n \cdot p$, and $\Delta\lambda = \Delta n \cdot p$, respectively, wherein p is a screw pitch, n is an average refractive index within a plane orthogonal to the screw axes, and $\Delta n$ is birefringence. The reflected light by the cholesteric liquid crystal layer of the planar phase is tinged with a clear color dependent on the screw pitch.

Cholesteric liquid crystal having positive dielectric anisotropy exhibits three states: namely, a planar phase in which screw axes become perpendicular to the surface of a cell to thus induce the above-described phenomenon of selectively reflecting incident light as shown FIG. 16A, a focal conic phase in which screw axes become essentially parallel to the surface of a cell to thus permit transmission of incident light while the incident light is slightly scattered forward as shown in FIG. 16B, and a homeotropic phase in which the screw structures become untied and liquid-crystal directors are oriented in the direction of an electric field to thus allow transmission of incident light.

Of the above three phases, the planar phase and the focal conic phase can be bistably present in a field-free state. Consequently, the phase of cholesteric liquid crystal is not uniquely determined with respect to the strength of an electric field applied to a liquid crystal layer. When the planar phase is an initial state, the phase changes from the planar phase, the focal conic phase, and the homeotropic phase, in this sequence with an increase in the strength of the electric field. When the focal conic phase is an initial state, the phase changes from the focal conic phase to the homeotropic phase in this sequence in accordance with an increase in the strength of the electric field.

When the strength of the electric field applied to the liquid crystal layer is abruptly reduced to zero, the planar phase and the focal conic phase remain intact, and the homeotropic phase changes to the planar phase.

Consequently, immediately after application of a pulse signal the cholesteric liquid crystal layer exhibits a switching behavior such as that shown in FIG. 17. In the case where an initial state is the planar phase, when the voltage of the applied pulse signal is Vph or more, there is achieved a selective reflection state obtained as a result of the homeotropic phase having changed to the planar phase, as indicated by the white circles. When the voltage ranges between Vpf and Vph, a transmission state realized by the focal conic phase is achieved. When the voltage is Vpf or less, a state realized before application of the pulse signal becomes continual; namely, the selective reflection state realized by the planar phase is achieved.

Meanwhile, in the case where an initial state is the focal conic phase, when the voltage of the applied pulse signal is Vfh or more, there is achieved the selective reflection state obtained as a result of the homeotropic phase having changed to the planar phase, as indicated by the black circles. When the voltage of the applied pulse signal is Vfh or less, a state realized before application of the pulse signal becomes continual; namely, the transmission state realized by the focal conic phase is achieved.

In the drawing, the vertical axis represents normalized reflectance. Reflectance is normalized on the assumption that the maximum reflectance is 100 and that the minimum reflectance is zero. It is assumed that a phase change of the planar phase and the homeotropic phase assumes a threshold voltage of Vph, a phase change of the planar phase and the focal conic phase assumes a threshold voltage of Vpf, and a phase change of the focal conic phase and the homeotropic phase assumes a threshold voltage of Vfh. Furthermore, there is a transition region between the planar phase, the focal conic phase and the homeotropic phase. Normalized reflectance defined as a threshold level is represented by dotted lines. In the drawing, normalized reflectance 50 is indicated by a threshold level.

The liquid crystal device of this technique implements a monochrome display of black and white with a memory characteristic in a field-free state or a color display with a memory characteristic in a field-free state, by means of switching (A) a selective reflection state realized by the planar phase and (B) a transmission state realized by the focal conic phase by utilization of the bistable phenomenon of the cholesteric liquid crystal.

Furthermore, in the liquid crystal device of this technique, the self-retention type liquid crystal compound and the organic photoconductor can be formed by coating an undiluted solution or through a laminate process. The liquid crystal device can be fabricated conveniently at low cost. Furthermore, both the self-retention type liquid crystal compound and the organic photoconductor can easily realize resolutions required for hard copy and, therefore, can enhance display resolving power of the liquid crystal device.

The liquid crystal device of this technique can perform writing of an image by forming an image although exposure is not performed over the whole surface at the same time and scanning the surface of the liquid crystal device by use of an exposure device of a scanning system (for example, a laser light exposure device) or a light-emitting diode array.

There is shown in FIG. 18 a diagram showing a shape in which an image is written using the exposure device of the scanning system by means of a general method of driving a liquid crystal device. As illustrated in FIG. 18, the liquid crystal device of this technique includes a display layer (i.e., a liquid crystal layer) and an OPC layer (i.e., a photoconductive layer), which are laminated with, for example, a light-blocking layer intervened therebetween between a pair of electrode substrates. After the whole surface of the display layer is reset to the planar phase, the surface on the OPC layer side is exposed like an image using an exposure device, such as a line head or a beam scanner, with a bias voltage being applied to the pair of the electrodes, thereby recording a writing image on the surface.

As mentioned above, the liquid crystal layer at the time of writing forms a desired writing image by obtaining contrast between a portion at which a phase changes from the planar phase to the focal conic phase and a portion at which a phase does not change from the planar phase to the focal conic phase depending on whether exposure is performed. A phase change from the planar phase to the focal conic phase needs some degree of time. Specifically, the liquid crystal layer completes the phase change by taking several hundreds of ms (approximately 200 ms or more). Accordingly, since a writing time of several hundreds of ms is taken every scan line (or 1 pixel), a great period of time is taken to write the whole surface of the liquid crystal device. For this reason, it could be said that the above technique is not sufficient regarding practical use in writing.

There is also a technique for significantly shortening a writing time taken every scan line (or 1 pixel) by reducing time necessary for a phase change.

SUMMARY

According to one aspect of the present invention, there is provided a method for driving a liquid crystal device to record an image on the liquid crystal device, the liquid crystal device comprising: a pair of electrodes; and a liquid crystal layer sandwiched between the pair of electrodes, the liquid crystal layer containing a cholesteric liquid crystal, the method comprising:

applying a voltage V1 between the pair of electrodes to make the liquid crystal layer to be in a homeotoropic phase, the voltage V1 being higher than a threshold value of a phase change to the homeotropic phase in the liquid crystal layer;

applying selectively one of two voltages V2H and V2L to each portion of the liquid crystal layer, the two voltages V2H and V2L being higher than the voltage V1, the voltage V2H being higher than the voltage V2L; and applying a voltage V3 between the pair of electrodes under a condition of such a magnification and application time of the voltage V3 that a phase of a portion to which the voltage V2H has been applied changes to a planar phase and a phase of a portion to which the voltage V2L has been applied changes to a focal conic phase.

BRIEF DESCRIPTION OF THE DRAWINGS

Embodiments of the present invention will be described in detail based on the following figures, wherein:

FIGS. 16A to 16C are explanatory views diagrammatically showing a relationship between molecular orientation of cholesteric liquid crystal and an optical characteristic, wherein FIG. 16A shows a planar phase, FIG. 16B shows a focal conic phase, and FIG. 16C shows a homeotropic phase;

DETAILED DESCRIPTION

Exemplary constructions of the present invention will be described below.

Figure 16A:
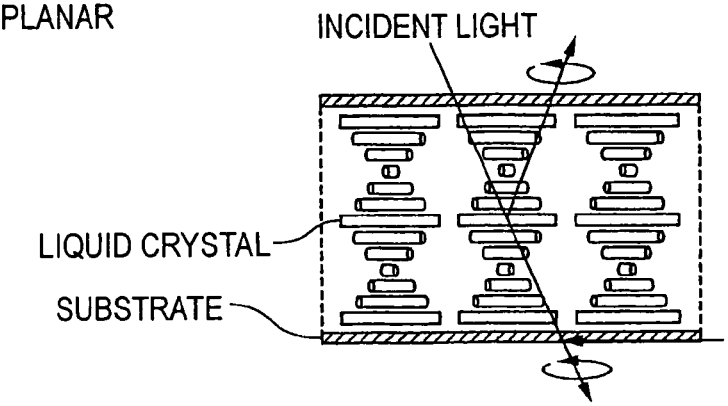
Figure 16B:
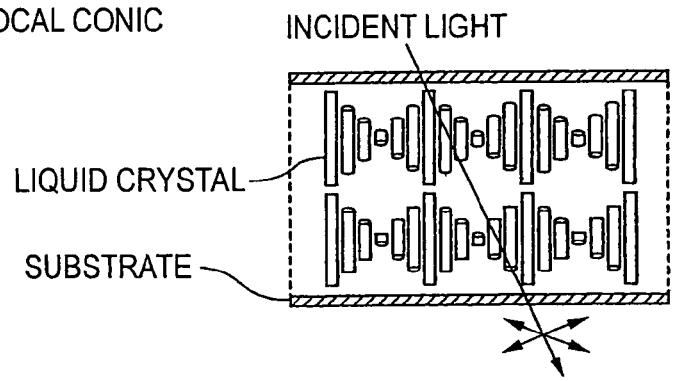
Figure 16C:
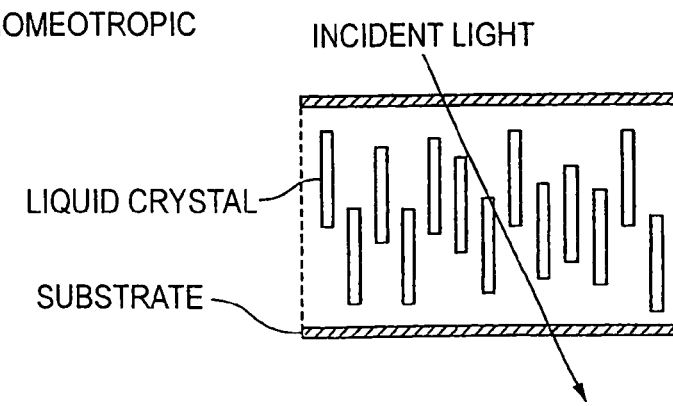

As mentioned earlier, in the liquid crystal layer comprised of cholesteric liquid crystal, a phase changes from the planar phase to the focal conic phase or the homeotropic phase in accordance with application of voltage (refer to FIGS. 16A to 16C).

In the background art, an image is written by driving the liquid crystal device by employing a phase change between the three phases of the planar phase, the focal conic phase and the homeotropic phase or the transitional planar phase (i.e., a transitional phase) in cholesteric liquid crystal.

Figure 1:
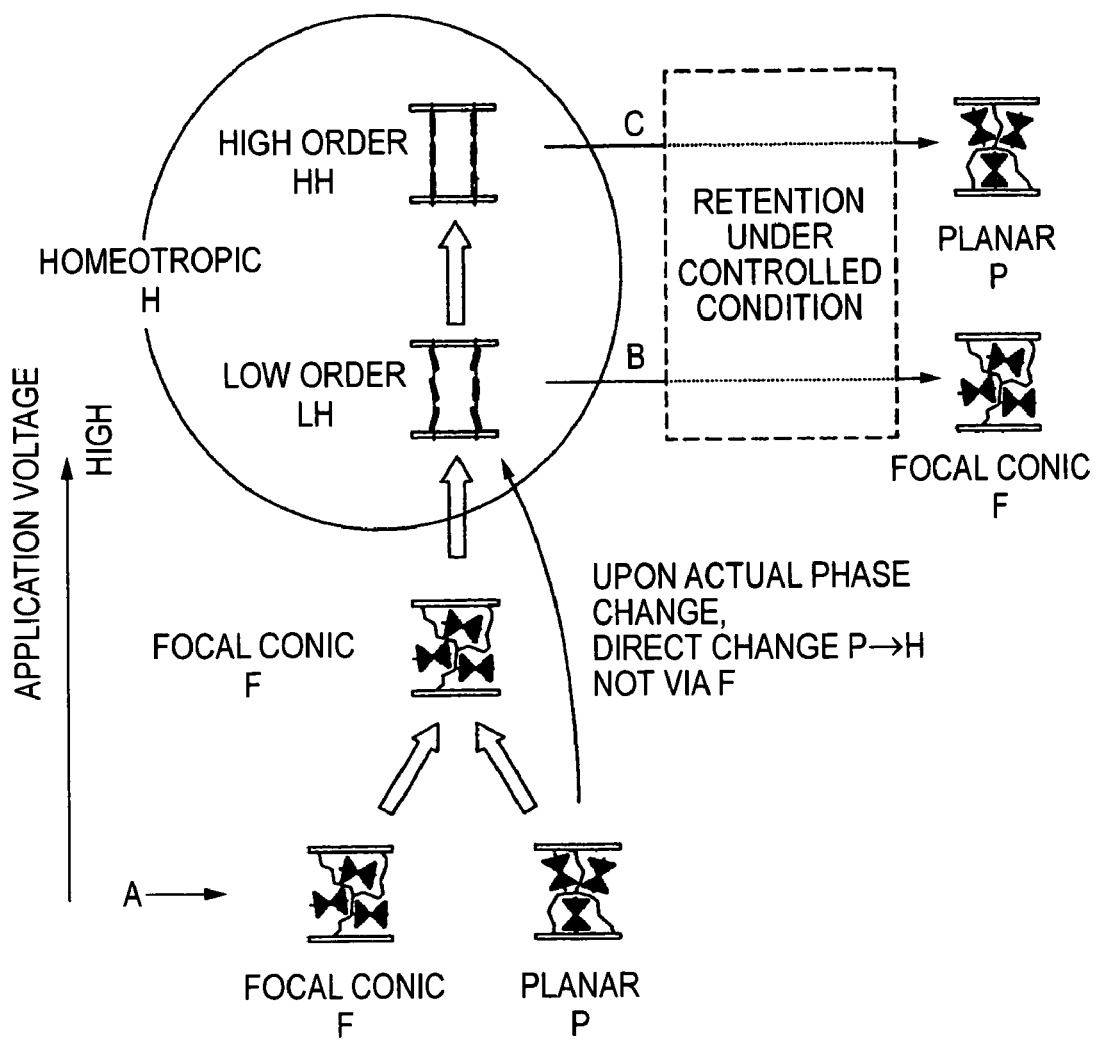
FIG. 1 is an explanatory view illustrating change in a liquid crystal phase according to one aspect of the present invention.

FIG. 1 is an explanatory view illustrating change in the liquid crystal phase according to one aspect of the present invention. In FIG. 1, a state indicated by the arrow A refers to a state in which any voltage is not applied in cholesteric liquid crystal and in which a focal conic phase F and a planar phase P exist together. In addition, in the state before application of the voltage, it is not required that both the focal conic phase F and the planar phase P exist together, but any one of the focal conic phase F and the planar phase P may exist.

If the applied voltage exceeds a value, a portion in which the planar phase P existed changes to the focal conic phase F, and both the portions become the focal conic phase F. If the applied voltage becomes sufficiently high, any one of the planar phase P and the focal conic phase F changes to the homeotropic phase H. In general, the homeotropic phase H is recognized as one phase. In reality, however, the orientation state of liquid crystal, of the same homeotropic phase H, is not the same, but there is variation in the orientation of each liquid crystal. It is thus presumed that the degree of variation changes as the high and low of the applied voltage.

Figure 2:
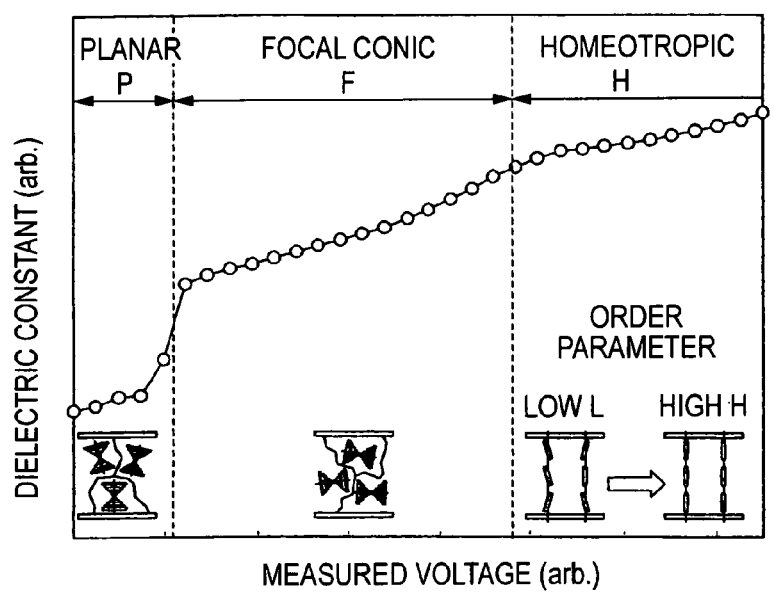
FIG. 2 is a graph showing a relationship between a measured voltage of a sine wave when voltage applied to a liquid crystal layer containing cholesteric liquid crystal is changed, and a dielectric constant acquired through impedance measurement.

FIG. 2 is a graph showing the dielectric constant of the liquid crystal layer comprised of cholesteric liquid crystal, which is measured while a measurement voltage is changed. The graph shows a result of measuring change in the dielectric constant for voltage by using an impedance analyzer (manufactured by TOYO TECHNICA Co., Ltd., 126096W) with respect to a liquid crystal device (a display medium) fabricated in an embodiment to be described later on. In addition, a measurement frequency is set to 1 kHz in which the liquid crystal responds to an actual value and polarizations of ion kinds, which exist in the liquid crystal together, are considered not to substantially contribute to the dielectric constant.

As can be seen from the graph of FIG. 2, the phase of the liquid crystal layer comprised of cholesteric liquid crystal sequentially changes from the planar phase P, the focal conic phase F, and the homeotropic phase H, in this sequence in accordance with an increase in the applied voltage. As the ratio of liquid crystal oriented toward a molecular long axis in the direction of an electric field increases, the dielectric constant increases. Furthermore, even after a phase change to the homeotropic phase H, the dielectric constant continues to rise.

In this case, in the homeotropic phase H, the screw structures of the liquid crystal become untied, and respective liquid crystal molecules are untied with them being arranged in the direction of an electric field. However, the director (in the direction of the molecular long axis) of each liquid crystal molecule in an actual homeotropic phase H is spatially deviated, so that it is slightly inclined from the direction of the electric field. An average of deviation of the liquid crystal molecular long axis with respect to macroscopic priority orientation is called "order parameter S".

Figure 3:
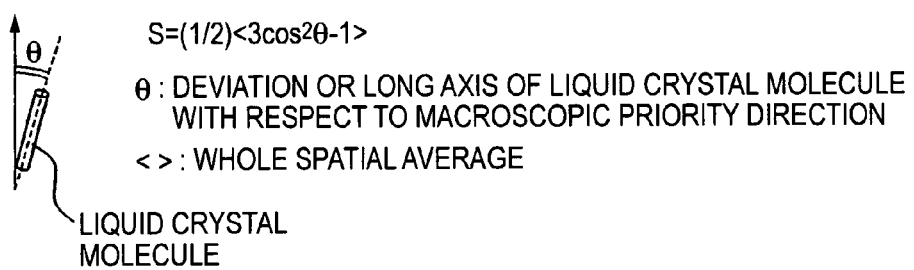
FIG. 3 is an explanatory view illustrating an order parameter S of liquid crystal.

FIG. 3 is an explanatory view illustrating the order parameter S of the liquid crystal. Assuming that an arrow direction is the macroscopic priority direction (the direction of an electric field in the homeotropic phase H) and deviation of the long axis of liquid crystal molecules with respect to the macroscopic priority direction is θ (°), the order parameter S can be expressed in the following equation.

$$S=(1/2)<3\cos 2\theta -1>$$

where "$<3\cos 2\theta-1>$" indicates the whole spatial average of the value "$3\cos 2\theta-1$" of the liquid crystal molecules.

It is estimated that a slow increase in the dielectric constant due to an increase in the applied voltage after a phase change to the homeotropic phase H means that the long axis direction of the liquid crystal molecule is also oriented so that it is arranged in the direction of an electric field (the order parameter S increases). In a state where the dielectric constant changes slowly in the homeotropic phase H, two states; namely, a state where the order parameter S is small (hereinafter, referred to as a "low-order homeotropic phase", which is also referred to as "LH") and a state where the order parameter S is great (hereinafter, referred to as a "high-order homeotropic phase", which is also referred to as "HH") are picked. If voltage in which conditions, such as the magnitude and application time of the voltage, are properly controlled based on the states, is applied and maintained, the phases of the states change as indicated by the arrows B and C and thus become the focal conic phase F and the planar phase P, respectively. That is, if subsequent retention conditions are controlled properly by selecting a state having a different order parameter S from the homeotropic phase H, the liquid crystal device comprised of cholesteric liquid crystal can be driven to write an image.

It is presumed that the LH phase and HH phase refer to hysteresis in a subsequent transitional phase. Furthermore, the target phases of the LH phase and the HH phase can be induced by properly controlling applied voltage conditions (a magnitude, an application time, etc.) in a subsequent retention period when the order parameter S represents a relationship of high and low mutually.

In other words, in the method of driving a liquid crystal device according to one aspect of the present invention, liquid crystal molecules are arranged to the homeotropic phase H in the initialization process. The LH phase and the HH phase are selected by selectively changing the magnitude of voltage in the selection process. Voltage is applied under controlled conditions in the retention process, thereby making the respective phases the focal conic phase F and the planar phase P.

The above discussion is induced from driving conditions, etc. of the liquid crystal device in accordance with the method of driving a liquid crystal device according to one aspect of the present invention. The theory itself of liquid crystal driving has been reasoned. However, it has been demonstrated that to write an image by properly controlling voltage conditions has reappearance according to research by the present inventors, etc.

A change time from the LH phase to the HH phase is very short. Thus, in actual measurement result, a desired operation can be performed at most 0.1 ms. Therefore, if the present invention is employed to use a phase change in selection of writing, a writing time can be shortened significantly.

In the technique disclosed in Patent Document 2, which has been described in Technical Field, the speed of a phase change from the homeotropic phase to the transitional planar phase is very fast, and an image selection process is set to 0.2 ms. In the present invention, however, there is no transitional planar phase from the homeotropic phase, but a phase change within the homeotropic phase having a phase change speed faster than that of the transitional planar phase is used to select writing.

Time necessary for a change from the LH phase to the HH phase is about 0.1 ms. It is therefore possible to shorten a writing time by the maximum 50% in theory in comparison with the conventional technique using a phase change from the homeotropic phase H to the transitional planar phase TP. That is, according to the present invention, high-speed writing can be accomplished compared with the conventional technique.

In the method of driving a liquid crystal device according to one aspect of the present invention, in order to realize the above-mentioned writing, there are sequentially performed manipulations by three operations (operations); namely, (A) an initialization process (operation), (B) a selection process (operation), and (C) a retention process (operation). Description will be given by narrowing the present invention as a basic invention.

The initialization process (operation) (A) is a process (operation) of making the phase of the whole liquid crystal layer the homeotropic phase by applying a voltage V1 higher than a threshold value of a phase change to the homeotropic phase in the liquid crystal layer between the pair of the electrodes.

Figure 17:
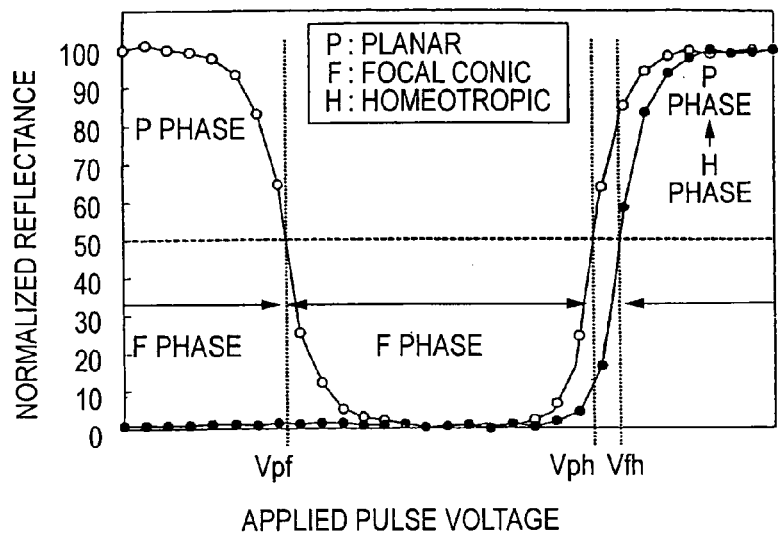
FIG. 17 is a graph illustrating switching behavior of cholesteric liquid crystal.
Figure 18:
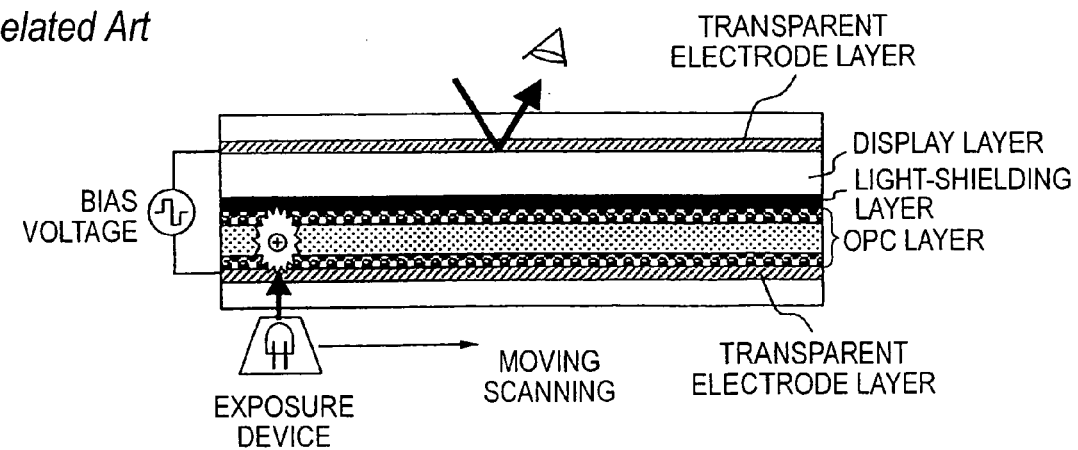
FIG. 18 is a diagram showing a shape in which an image is written using the exposure device of the scanning system by means of a general method of driving a liquid crystal device.

In the present process, cholesteric liquid crystal of the liquid crystal layer can be first arranged to the homeotropic phase. In addition, in relation to "the threshold value of the phase change to the homeotropic phase", the transitional region exists between the planar phase and the homeotropic phase and between the focal conic phase and the homeotropic phase, as mentioned above. Accordingly, in the present invention, a higher voltage when the planar phase or the focal conic phase is the initial state, of applied voltage in which the normalized reflectance becomes 90%, which has been described by reference to FIG. 17, that is, voltage in which the normalized reflectance becomes 90% or more not based on the initial state (in general liquid crystal material, a side in which the focal conic phase is the initial state is high in the threshold value voltage to the homeotropic phase compared with the planar phase. In the example of FIG. 17, the voltage becomes "Vfh 90") becomes a basis.

The selection process (operation) (B) is a process (operation) of selecting one of two kinds of higher and lower voltages V2H and V2L, which are higher the voltage V1, according to a portion and applying a selected voltage between the pair of the electrodes.

It is required that the lower voltage V2L be higher than the voltage V1. However, the lower voltage V2L may be the same as the voltage V1. Meanwhile, it is required that the higher voltage V2H be higher than the lower voltage V2L. Any one of the higher voltage V2H and the lower voltage V2L is selectively applied within applied voltage representing the homeotropic phase, thereby writing an image.

In other words, it is estimated that in the present process, a portion to which the lower voltage V2L was applied has changed to the low-order homeotropic phase LH, and a portion to which the higher voltage V2H was applied has changed to the high-order homeotropic phase HH. In addition, in the present invention, a case where voltage is slightly low quantitively is not set to LH and a case where voltages is slightly high quantitively is not set to HH, but two states in which order parameters when the two kinds of higher and lower voltages V2H and V2L are applied in regions higher than the voltage Vfh90 are relatively different from each other are defined to be LH and HH in this sequence from a lower side. For this reason, even in the case of the same applied voltage, there is a case where the phase can change to LH or HH according to the magnitude of applied voltage on the other side.

There are no specific preferred conditions with respect to a magnitude or application time of applied voltage. Specifically, the two kinds of higher and lower applied voltages V2H and V2L are selected, a phase of liquid crystal changes to the LH phase and the HH phase, and voltage is applied while it is properly controlled in a subsequent retention process (C). As a matter of course, a difference between the high voltage V2H and the low voltage V2L can be great by taking the degree of freedom in control or latitude in the retention process (C) into consideration.

The retention process (operation) (C) is a process (operation) of obtaining a display image by applying a voltage V3 between the pair of the electrodes under the conditions of the magnitude and application time of voltage in which the phase of a portion of the HH phase in which the higher voltage V2H has been selected changes to the planar phase, and the phase of a portion of the LH phase in which the lower voltage V2L has been selected changes to the focal conic phase, in the selection process of the liquid crystal layer.

In the present process, a display image is obtained by applying a controlled voltage on condition that the phases of the respective portions representing the HH phase to the LH phase change to the planar phase to the focal conic phase, respectively. Conditions on the magnitude and application time of voltage are previously secured, and voltage can be applied according to the conditions.

It is presumed that the HH phase and the LH phase represent hysteresis in a subsequent transitional phase as mentioned above. A subject to be selected succeeds by the hysteresis. Therefore, after each applied voltage is removed, a phase change, such as that a portion of the HH phase in which the higher voltage V2H has been selected changes to the planar phase and a portion of the LH phase in which the lower voltage V2L has been selected changes to the focal conic phase, occurs, thereby displaying an image.

A construction in which the method of driving a liquid crystal device according to one aspect of the present invention is applied to the optical address type liquid crystal device having a liquid crystal layer and a photoconductive layer between the pair of electrodes will be described hereunder.

In the case where the method is applied to the optical address type liquid crystal device, the manipulation of the selection process (operation) (B) is not basically selected by selecting applied voltage, but is selected by a portion in such a manner that with the applied voltage being set constant, a divided voltage applied to the liquid crystal layer is changed by turning on/off address light P2', and as a result, the lower voltage V2L higher than the voltage V1 is applied to a portion of the liquid crystal layer irradiated with the address light P2', and the higher voltage V2H higher a given voltage than the lower voltage V2L is applied to a portion of the liquid crystal layer irradiated with the address light P2'.

In addition, a construction is possible in which address light is not turned on/off, but the address light is always radiated, and a divided voltage applied to the liquid crystal layer is changed by selecting the light intensity of the address light, such as two kinds of higher and lower light intensities P2H and P2L. In other words, a portion of the liquid crystal layer is selected such that the lower voltage V2L higher than the voltage V1 is applied to a portion irradiated with the address light P2L of the lower light intensity, and the higher voltage V2H higher than the lower voltage V2L is applied to a portion irradiated with the address light P2H of the higher light intensity.

In other words, by selecting turn-on/off or intensity (high or low) of the address light, voltage applied to the liquid crystal layer can become a state where it is applied to the liquid crystal layer by selecting one of the two kinds of higher and lower voltages V2H and V2L, which are higher than the voltage V1, according to the portion.

Furthermore, even in the initialization process (operation) (A) and the retention process (operation) (C), a subject, which makes applied voltage the voltage V1 and the voltage V3, is not the pair of electrodes, but the liquid crystal layer. Therefore, voltage that must be applied to the pair of electrodes differs from that of the basic invention as much as the photoconductive layer is laminated, in the same manner as the selection process (operation) (B).

That is, in the initialization process (operation) (A), a voltage V1' is applied between the pair of the electrodes by controlling the magnitude of the voltage so that the voltage V1 higher than a threshold value of a phase change to the homeotropic phase in the liquid crystal layer is applied to the liquid crystal layer. Furthermore, in the retention process (operation) (C), a voltage V3' is applied between the pair of the electrodes by controlling the magnitude and application time of voltage on condition that the phase of a portion of the liquid crystal layer, to which the higher voltage V2H has been applied, changes to the planar phase and the phase of a portion of the liquid crystal layer, to which the lower voltage V2L has been applied, changes to the focal conic phase in the selection process.

In either process, not only voltage, but also address light can be used together. That is, address light can be radiated while voltage is applied such that the divided voltage applied to the liquid crystal layer becomes voltage that fills the conditions (A) and (C).

In other words, in the initialization process (operation) (A), address light P3 is radiated while a voltage V3" is applied between the pair of electrodes by controlling the magnitude and application time of the voltage, and the light intensity of the address light such that the voltage V1 higher than a threshold value of a phase change to the homeotropic phase in the liquid crystal layer is applied to the liquid crystal layer. Furthermore, in the retention process (operation) (C), the address light P3 is radiated while the voltage V3" is applied between the pair of the electrodes by controlling the magnitude of the voltage, the application time of the voltage, and the light intensity of the address light on condition that the phase of a portion of the liquid crystal layer, to which the higher voltage V2H has been applied, changes to the planar phase and the phase of a portion of the liquid crystal layer, to which the lower voltage V2L has been applied, changes to the focal conic phase in the selection process.

In this case, a radiation device of the address light needs a device for batch-exposing the whole surface of the liquid crystal device in a desired image pattern. However, in a construction in which the address light is radiated only in the selection process (B) in a state where voltage applied between the pair of the electrodes in each of the initialization process (A), the selection process (B) and the retention process (C) is set to be the same, any one of device for irradiating the liquid crystal device with the address light while scanning the liquid crystal device in one dimension, and device for irradiating the liquid crystal device with the address light while scanning the liquid crystal device in two dimensions may be used.

Figure 4:
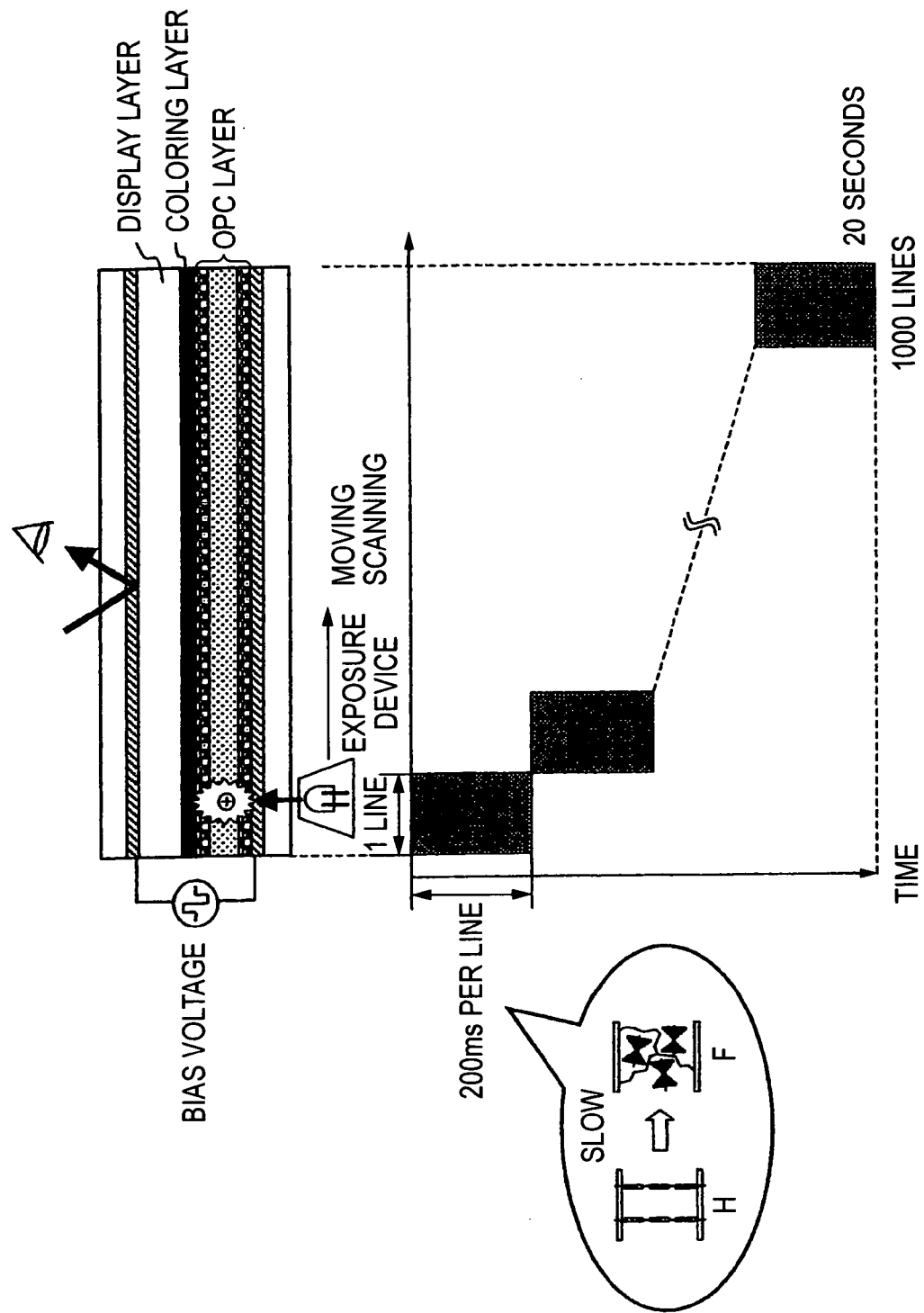
FIG. 4 is an explanatory view illustrating a writing time when writing is performed using an exposure device of a scanning system by means of a method of driving a liquid crystal device in the background art.

In the background art, a phase change from the planar phase to the focal conic phase, which requires time of several hundreds of ms is employed. As illustrated in FIG. 4, time of at least 200 ms per line is required, and exposure of a next line is performed after a phase change is fully generated. Accordingly, time of 200 ms or more×line number is required in writing. For example, in the case where an image of 1000 lines is written, time of 20 seconds is required, and in the above technique, it does not sufficiently cope with the requirement of high-speed writing.

In addition, FIG. 4 is an explanatory view illustrating a writing time when writing is performed using the exposure device of the scanning system by means of the method of driving a liquid crystal device in the background art.

In the present invention, a phase change (LH phase->HH phase) within the homeotropic phase, which has a phase change speed much faster than that of a phase change from the planar phase to the focal conic phase, is used in selection for writing.

Figure 5:
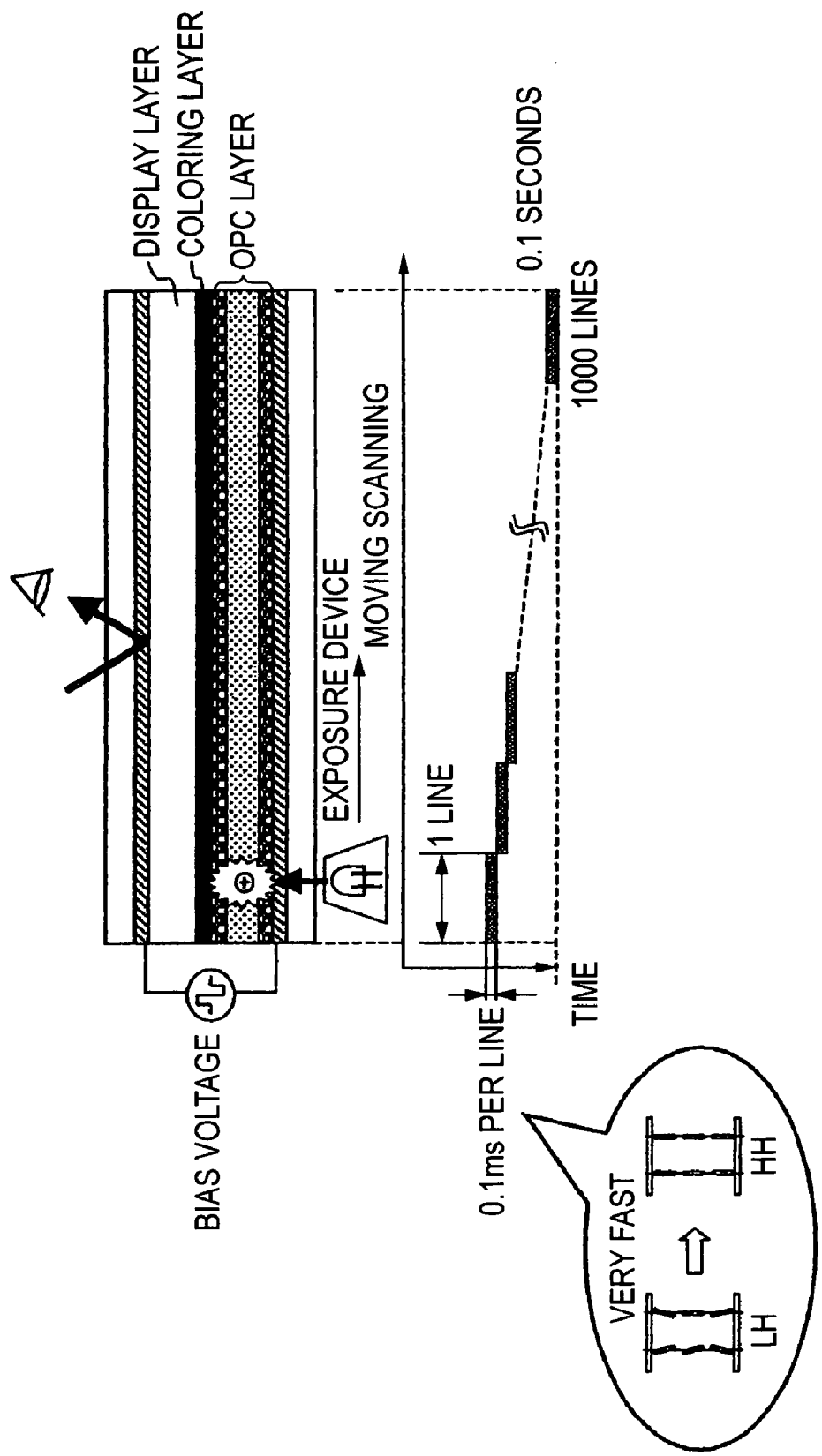
FIG. 5 is an explanatory view illustrating a writing time when writing is performed in an exposure device of a scanning system by means of a method of driving a liquid crystal device according to one aspect of the present invention.

Time required for a phase change from the low-order homeotropic phase LH to the high-order homeotropic phase HH is about 0.1 ms. Thus, a writing time can be shortened up to the maximum 0.05%, in theory, compared with the conventional technique employing a phase change from the planar phase P to the focal conic phase F. An explanatory view, which is the same as that of FIG. 4, for describing a writing time taken by the method of driving a liquid crystal device according to the present invention, is shown in FIG. 5. As is evident from FIG. 5, in accordance with the present invention, a writing time of one line can be shortened significantly and, therefore, an overall writing time can be reduced significantly.

That is, time required for writing is "0.1 ms"×line number. For example, in the case where an image of 1000 lines is written, time of at most about 0.1 seconds is sufficient. It is thus possible to realize high-speed writing, which was impossible in the above conventional technique.

In one aspect of the present invention, two-dimensional batch exposure device by surface emission may be used as the exposure device.

Hereinafter, the present invention will be described in detail in connection with exemplary embodiments by reference to the drawings.

FIRST EMBODIMENT

Figure 6:
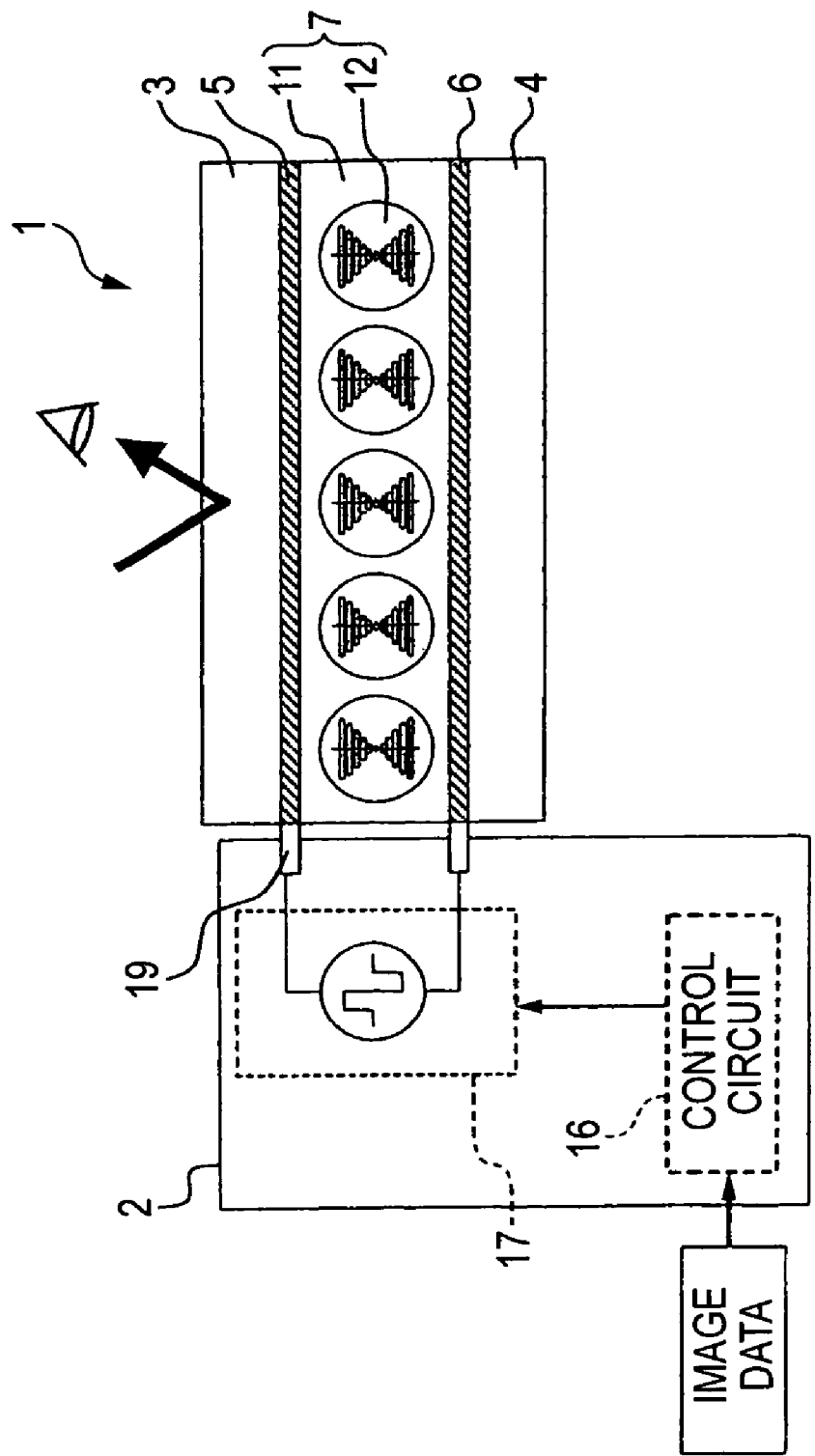
FIG. 6 is a schematic construction showing an illustrative embodiment of a system employing the method of driving a liquid crystal device according to one aspect of the present invention.

FIG. 6 is a schematic construction showing an illustrative embodiment of a system employing a method of driving a liquid crystal device according to one aspect of the present invention. The system of the present embodiment includes a display medium (a liquid crystal device) 1 and a writing apparatus (a drive device for a liquid crystal device) 2. These constituent elements will be first described in detail, and operations thereof will be then described.

<Display Medium>

In the present invention, the display medium is a member which enables selective driving of a display layer (a liquid crystal layer) by selective application of a bias signal; specifically, a liquid crystal device.

In the present embodiment, the display medium 1 is a subject formed by means of stacking, in sequence from a display surface side, a substrate 3, an electrode 5, a display layer (a liquid crystal layer) 7, an electrode 6, and a substrate 4.

In addition, the present invention can be applied to a case where the electrodes 5 and/or 6 are partitioned every pixel or line, forming a cell. However, in this embodiment, a case where the electrodes 5 and/or 6 are not partitioned will be described. Furthermore, a coloring layer (a light-blocking layer) 9 used in a second embodiment to be described later may be provided on a non-display screen side rather than the display layer 7.

(Substrate)

The substrates 3, 4 are members intended for retaining respective functional layers on interior surfaces of the substrates, to thus maintain the structure of a display medium. The substrates 3, 4 are sheet-shaped subjects having strength withstanding external force. The substrates 3, 4 can possess flexibility. An inorganic sheet (e.g., glass, silicon), a polymeric film (e.g., polyethylene terephthalate, polysulfone, polyethersulfone, polycarbonate, polyethylene naphthalate), and the like. In addition, one of the substrates 3, 4 at least on a display surface side has the function of enabling transmission of display light. A known functional film, such as an antifouling film, an abrasion resistant film, an anti-reflection film, a gas barrier film, and the like, may be formed on the exterior surface of the substrate.

(Electrode)

Transparent electrodes 5, 6 are members intended for uniformly applying a bias voltage applied by the writing apparatus 2 to each of the functional layers within the display medium 1. Specifically, a conductive thin film formed from metal (e.g., gold, silver, copper, iron, aluminum), a metallic oxide (e.g., an indium oxide, a tin oxide, an indium-tin oxide (ITO)), carbon, a composite formed by dispersing metal and carbon into polymer, a conductive organic polymer (e.g., polythiophene-based conductive organic polymers and polyaniline-based conductive organic polymers), and the like, can be mentioned as the materials for the electrodes. Known functional films, such as an adhesion improvement film, an anti-reflection film and a gas barrier film, may also be formed over the surface of the electrodes.

(Display Layer)

In the present invention, the display layer (liquid crystal layer) comprises cholesteric liquid crystal, have the function of modulating reflection and transmission states of incident light by means of an electric field, and have a characteristic of enabling retaining a selected state in a field-free state. The display layer can have a structure, which does not become deformed by external force, such as flexure or pressure.

In cholesteric liquid crystals 12, liquid crystal molecules are twisted and oriented in a helical shape. The cholesteric liquid crystals 12 interfere and reflect specific light dependent on a screw pitch, of light incident from a screw axis direction. The orientation of the cholesteric liquid crystals 12 is changed by means of an electric field, and the reflection state of the cholesteric liquid crystals 12 can be changed.

Specific liquid crystal, which can be used as the cholesteric liquid crystals 12, includes liquid crystals formed by means of adding a chiral material (e.g., steroid-based cholesterol derivatives, Schiff-base-based materials, azo-based materials, ester-based materials, biphenyl-based materials) to nematic liquid crystals, and smectic liquid crystals (e.g., Schiff-base-based liquid crystals, azo-based liquid crystals, azoxy-based liquid crystals, benzoic-ester-based liquid crystals, biphenyl-based liquid crystals, terphenyl-based liquid crystals, cyclohexyl-carboxylate-based liquid crystals, phenylcyclohexane-based liquid crystals, biphenylcyclohexane-based liquid crystals, pyrimidine-based liquid crystals, dioxane-based liquid crystals, cyclohexyl-cyclohexane-ester-based liquid crystals, cyclohexyl-ethane-based liquid crystals, cyclohexane-based liquid crystals, tolan-based liquid crystals, alkenyl-based liquid crystals, stilbene-based liquid crystals, multiply-fused-ring-based liquid crystals), or mixtures thereof or the like.

The helical pitch of cholesteric liquid crystal is adjusted by means of the amount of chiral agent added to nematic liquid crystal. For instance, when blue, green, and red are taken as display colors, the center wavelengths of selective reflection are set to fall within a range of 400 nm to 500 nm; a range of 500 nm to 600 nm, and a range of 600 nm to 700 nm, respectively. In order to compensate for temperature dependence of the helical pitch of cholesteric liquid crystal, there may also be used a known technique of addition of a plurality of chiral agents which twist in different directions or exhibit reverse temperature dependence characteristics.

The display layer may comprise only cholesteric liquid crystal, but may have a PSCT (Polymer Stabilized Cholesteric Texture) structure including mesh-shaped resin in a continuous phase of cholesteric liquid crystal, a SSCT (Surface Stabilized Cholesteric Texture) where the interior surface of a substrate has undergone vertical orientation, or a PDCLC (Polymer Dispersed Cholesteric Liquid Crystal) structure where cholesteric liquid crystal is dispersed in the form of a droplet in a polymeric framework structure. By adopting the PSCT structure, the SSCT structure or the PDCLC structure, bistability between the planar phase and the focal conic phase can be enhanced by means of an anchoring effect arising in an interface between cholesteric liquid crystal and polymers, thereby retaining a display image for a long period of time.

Incidentally, the display layer may have a self-retention type liquid crystal compound, which does not become deformed by external force, such as flexure or pressure. Accordingly, the display layer of the present embodiment has the PDCLC structure in which the cholesteric liquid crystals 12 are dispersed in a polymer matrix (transparent resin) 11, as illustrated in FIG. 6.

The PDCLC structure can be formed according to a known method for subjecting polymer matrix and cholesteric liquid crystal to phase separation; for example, a PIPS (Polymerization Induced Phase Separation) method for mixing liquid crystal with polymeric precursors, such as acrylic precursors, thiol-based precursors or epoxy-based precursors, which effect polymerization by means of heat, light, electron beams, and the like, and for polymerizing the mixture in a uniform phase and subjecting the thus-polymerized mixture to phase separation; an emulsion method for mixing liquid crystal with macromolecules exhibiting low liquid-crystal solubility, such as polyvinyl alcohol, agitating and suspending the mixture, and dispersing the liquid crystal into macromolecules in the form of droplets; a TIPS (Thermally-Induced Phase Separation) method for mixing thermoplastic macromolecules with liquid crystal and cooling the mixture heated in a uniform phase to thus effect phase separation; and an SIPS (Solvent Induced Phase Separation) method for dissolving macromolecules and liquid crystal into a solvent such as chloroform and evaporating the solvent to thus subject the macromolecules to liquid crystal to phase separation. However, no limitations are imposed on the method for forming the PDCLC structure.

The polymeric matrix 11 has the function of retaining the cholesteric liquid crystals 12 and preventing the flow of liquid crystal (changes in an image), which would otherwise be caused by deformation of a display medium. A polymeric material—which is not dissolved in a liquid-crystal material and uses, as a solvent, a liquid incompatible with liquid crystal—an be used. The polymeric matrix 11 is desired to be a material, which has strength withstanding external force and exhibits high transmissivity for at least reflected light.

Materials which can be adopted as the polymeric matrix 11 include a water-soluble polymeric material (e.g., gelatin, polyvinyl alcohol, a cellulose derivative, a polyacrylic polymer, ethyleneimine, a polyethylene oxide, polyacrylamide, polystyrenesulfonate, polyamidine, and an isoprene-based sulfonic polymer); a material which can be formed into an aqueous emulsion (e.g., a fluororesin, a silicone resin, an acrylic resin, a urethane resin, an epoxy resin); and the like.

<Writing Apparatus>

In the present embodiment, the writing apparatus (an apparatus for driving a liquid crystal device) 2 is a device for writing an image on the display medium 1, and comprises, as a principal constituent element, a voltage application section (a power supply) 17 for applying a voltage to the display medium 1. Further, the writing apparatus is provided with a control circuit 16 for controlling the operation of the voltage application section 17.

(Voltage Application Section)

The voltage application section (power supply) 17 has the function of applying a bias voltage to the display medium 1. The voltage application section may be of any circuit, so long as it can apply a desired voltage waveform to the display medium (between the respective electrodes) in accordance with an input signal from the control circuit 16. However, in this case, the circuit is required to produce an AC output and achieve a high through rate. In the present embodiment, for instance, a bipolar high-voltage amplifier or the like may be used for the voltage application section 17.

The power supply application section 17 applies a voltage to the display medium 1 between the pair of electrodes 5, 6 via a contact terminal 19.

The contract terminal 19 is a member which contacts the voltage application section 17 and the display medium 1 (the electrodes 5, 6) to thus bring them into mutual conduction, and has high conductivity. A contact terminal which exhibits low resistance upon contact with the electrodes 5, 6 and the voltage application section 17 is selected. The contact terminal may have a structure for enabling separation of either the electrodes 5, 6 and the voltage application section 17 or separation of the electrodes 5, 6 and the voltage application section 17 from each other, so that the display medium 1 can be separated from the writing apparatus 2.

A terminal—which is formed from metal (e.g., gold, silver, copper, iron or aluminum), carbon, a composite formed by dispersing metal and carbon into polymers, a metallic oxide (e.g., an indium oxide, a tin oxide, an indium-tin oxide (ITO)), carbon, a composite formed by dispersing metal and carbon into polymer, a conductive organic polymer (e.g., a polythiophene-based conductive polymer), and the like, and which assumes the shape of a clip or connector for pinching an electrode—is mentioned as the contact terminal 19.

Furthermore, in an aspect in which the electrodes 5 and/or 6 are partitioned every pixel or line, thus forming a cell, the contact terminal is connected to each of the electrodes 5,6 properly, which are partitioned every pixel or line. Voltage from the voltage application section 17 can be applied to each pixel.

(Control Circuit)

The control circuit 16 is a member having the function of controlling the operation of the voltage application section 17 in accordance with image data input from the outside (an image-capturing device, an image receiver, an image processor, an image reproducing device, a device having a combination of these functions, or the like). Specific control operations of the control circuit 16 are embodied by processing pertaining to three steps (operations); namely, (A) the initialization process (operation), (B) the selection process (operation), and (C) the retention process (operation), all of which feature the present applied invention. Details of these operations will be described later.

<Operation>

A method of driving a liquid crystal device and the operation (manipulation) of an apparatus for driving a liquid crystal device according to the present invention will be described in detail below with reference to the apparatus for driving a liquid crystal device according to the present embodiment illustrated in FIG. 6.

Figure 7:
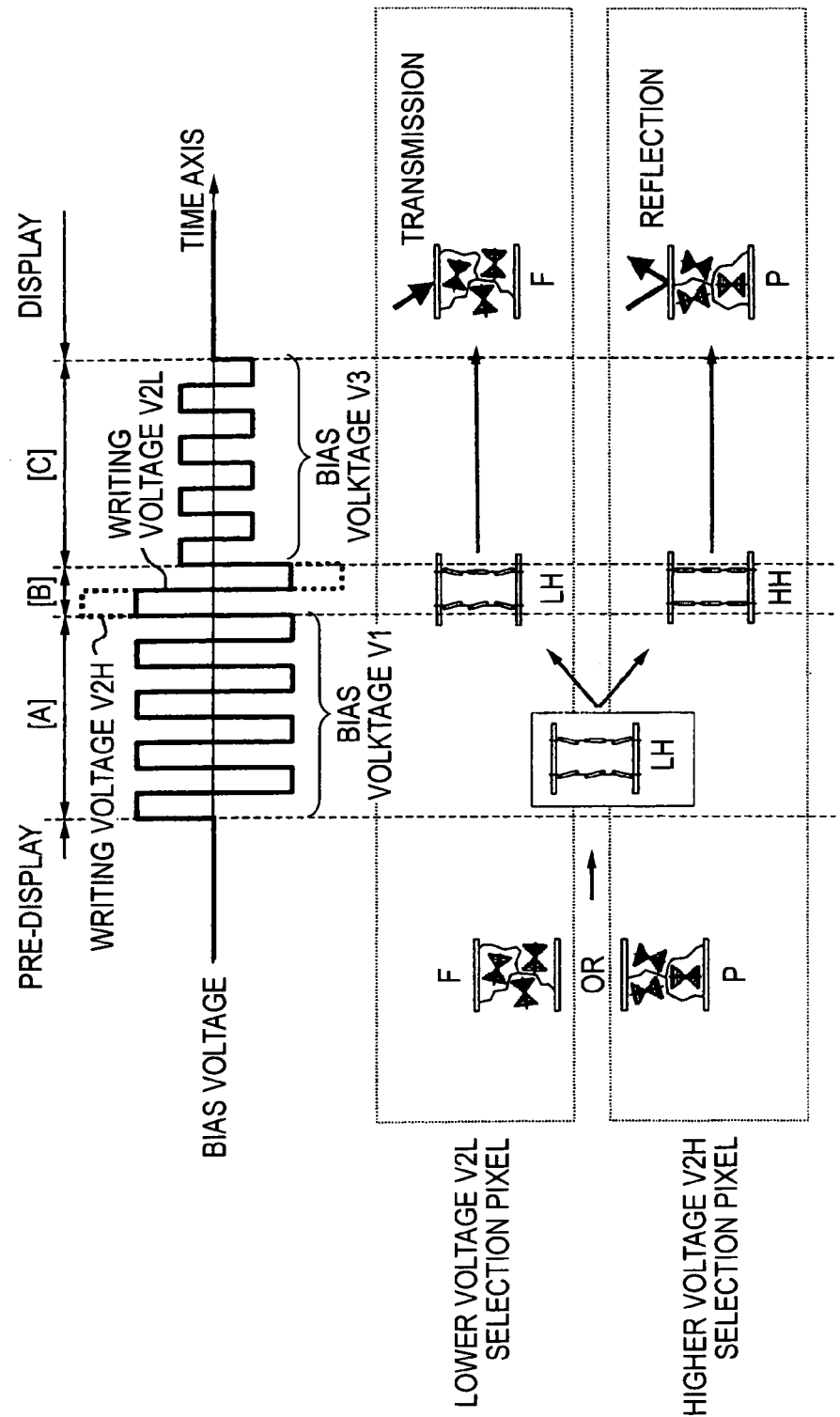
FIG. 7 is a chart diagrammatically showing, in time series, a relationship between an applied voltage and an orientation state of liquid crystal.

FIG. 7 is a chart diagrammatically showing, in time series, a relationship between an applied voltage between the pair of electrodes 5, 6 and an orientation state of liquid crystal with respect to the operation of the driving apparatus (the writing apparatus 2) of a liquid crystal device according to the present embodiment illustrated in FIG. 6.

As shown in FIG. 7, in the preparation period (the initialization process (A)), a bias voltage V1 of an AC pulse waveform is applied between the pair of electrodes 5, 6 by means of the voltage application section 17 from a pre-display state, namely, a state where the bias voltage is not applied.

In the preparation period, the bias voltage V1 higher than a threshold value of a phase change to the homeotropic phase is applied. Accordingly, the cholesteric liquid crystals 12 within the display layer 7 all become the homeotropic phase as shown in FIG. 7. The homeotropic phase in this step is the above-described low-order homeotropic phase LH.

In the writing period, actual writing is performed (the selection process (B)). More specifically, any one of two kinds of high and low writing voltages, which are higher than the voltage V1 (the higher voltage is V2H=a pulse of the dotted lines in FIG. 7, and the lower voltage is V2L=a pulse of the solid line of the period (B) in FIG. 7) is selected by a portion, and a selected voltage is applied between the pair of the electrodes by means of the voltage application section 17. In the present embodiment, the lower voltage V2L has the same magnitude and frequency as those of the bias voltage V1 applied in the preparation period. In the present invention, the bias voltage V1 and the lower voltage V2L may have not the same magnitude and frequency, and there may also be V1≦V2L.

In each portion, the phase of a portion in which the higher voltage V2H/the lower voltage V2L have been selected and to which the higher voltage V2H has been applied changes from the LH phase to the HH phase, and the phase of a portion to which the lower voltage V2L has been applied (a portion in which the applied voltage has not changed from V1) is kept to the LH phase.

Incidentally, as described above, the writing period adopts a change from the low-order homeotropic phase LH to the high-order homeotropic phase HH, in which a phase change speed is very fast in the present invention. Accordingly, time can be shortened significantly compared with the background art.

Finally, in the retention period, the state changes to the liquid crystal state in which an image is actually formed (the retention process (C)). It is presumed that the LH phase and the HH phase have a relationship of hysteresis in a subsequent transitional phase, and therefore a latent image in which other orientation states exist together is formed based on the HH phase and the LH phase. In this case, the bias voltage V3, which is controlled under the conditions of the magnitude and application time of voltage in which the phase of a portion in which the higher voltage V2H has been selected finally changes to the planar phase P and the phase of a portion in which the lower voltage V2L has been selected finally changes to the focal conic phase F, in the writing period, is applied between the pair of electrodes 5,6 by means of the voltage application section 17 in the retention period. Then, a display image comprising the planar phase P that transmits light and the focal conic phase F that reflects light, depending on the low and high of a voltage, which is selected in the writing period, is formed.

A mechanism in which the low-order homeotropic phase LH of the portion in which the lower voltage V2L has been selected changes to the selective transmission state of the focal conic phase F via the retention period, and a mechanism in which the high-order homeotropic phase HH of the portion in which the higher voltage V2H has been selected changes to the selective reflection state of the planar phase P via the retention period are not certain. However, such a phase change can be induced by controlling the conditions of the magnitude and application time of the bias voltage V3 applied in the retention period.

The above operations are sequentially performed, so that each portion (pixel) of the display layer can become the reflection state or the transmission state depending on selection of the high voltage V2H or the low voltage V2L in the writing period ((B) the selection process•operation). As described above, the state is selected and writing (actuation) on the liquid crystal device is performed accordingly.

SECOND EMBODIMENT

Figure 8:
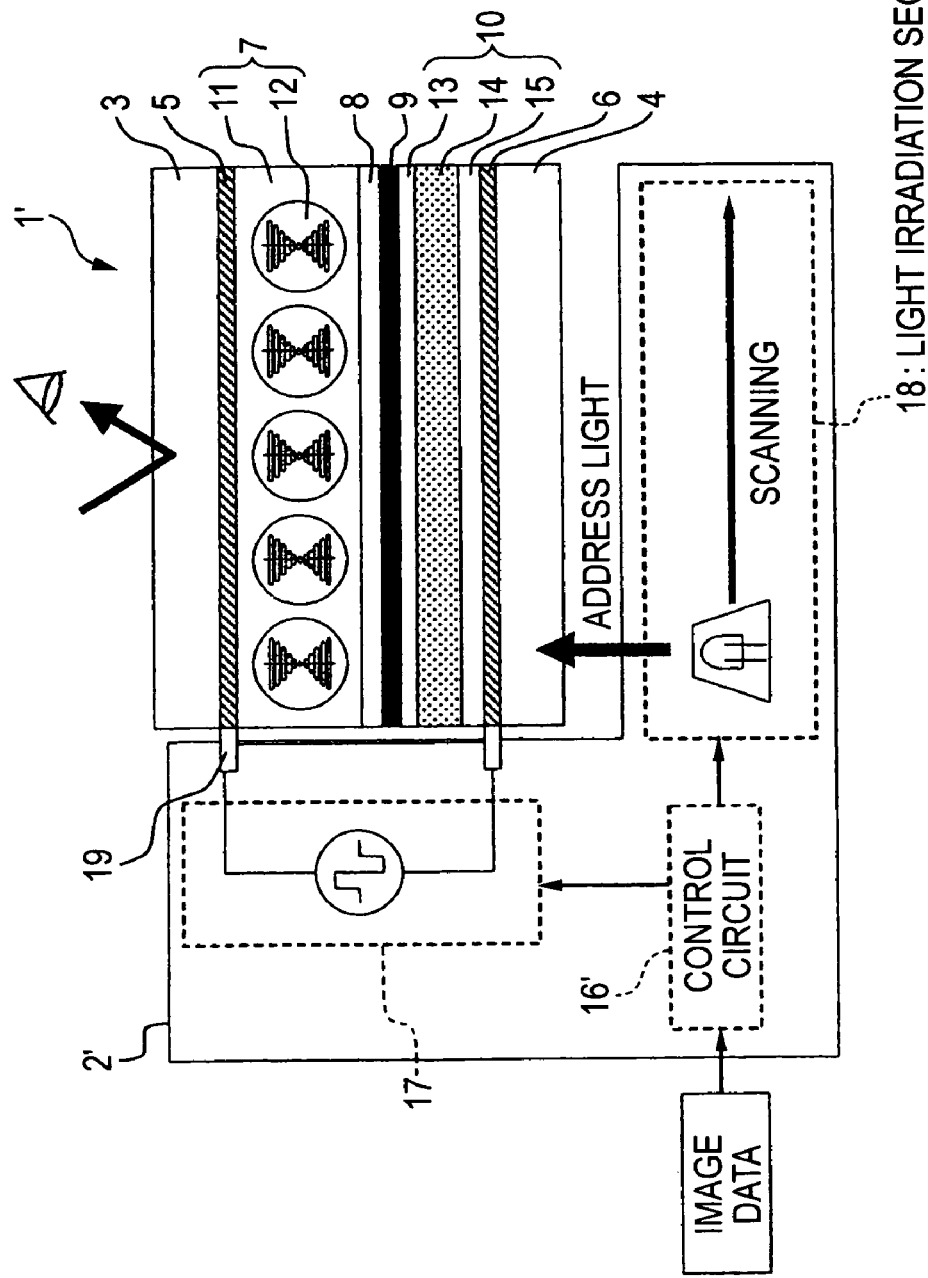
FIG. 8 is a schematic construction showing another illustrative embodiment of a system employing the method of driving a liquid crystal device according to one aspect of the present invention.

FIG. 8 is a schematic construction showing another illustrative embodiment of a system employing the driving method of the liquid crystal device according to one aspect of the present invention.

As in the case of the first embodiment, the system of the present embodiment also comprises a display medium (a liquid crystal device) 1' and a writing apparatus (an apparatus for driving a liquid crystal device) 2'.

However, the present embodiment differs from the first embodiment in that an optical address type liquid crystal device including a photoconductive layer is used as the display medium (liquid crystal device) 1'. Accordingly, the configuration of the writing apparatus (the apparatus for driving a liquid crystal device) 2' also becomes different.

The following descriptions chiefly provide differences between the first and second embodiments in terms of configuration, operation, and advantages. Those elements having the same functions as those of the first embodiment are assigned the same reference numerals, and their repeated explanations are omitted, as applicable.

<Display Medium>

A display medium of the present embodiment is an element, which can perform an optical address operation by means of exposure to address light or application of a bias signal. Specifically, the display medium is an optical address type liquid crystal device.

In the present embodiment, the display medium 1' is a substance formed by means of stacking, in sequence from a display surface side, a substrate 3; an electrode 5; a display layer (a liquid crystal layer) 7b; a display layer (a selective reflection layer) 7a; a laminate layer 8; a coloring layer (a light-shielding layer) 9; an OPC layer (a photoconductive layer) 10; an electrode 6; and a substrate 4. Specifically, the display medium 1' has a structure in which the laminate layer 8, the coloring layer (a light-shielding layer) 9, and the OPC layer (a photoconductive layer) 10 are sandwiched between the first display layer (a selective reflection layer) 7a of the display medium 1 and the electrode 6, both of which pertain to the first embodiment. Only these layers featured exclusively in the present embodiment will be described in detail hereunder.

(OPC Layer)

The OPC layer (a photoconductive layer) 10 is a layer which has an internal photoelectric effect and whose impedance characteristic changes according to the intensity of radiation of address light. The OPC layer 10 can perform AC operation and must be symmetrically activated in response to the address light. In the present embodiment, the OPC layer is formed into a three-layer structure, wherein charge generation layers (CGL) 13 on an upper side, a charge transport layer 14, and charge generation layers (CGL) 15 are laminated in sequence from an upper layer in FIG. 8.

The charge generation layers 13, 15 have the function of generating photo carriers by absorbing address light. The charge generation layer 13 controls the amount of photo carriers flowing from the electrode 5 on the display surface side to the electrode 6 on the write surface side. The charge generation layer 15 controls the amount of photo carriers flowing from the electrode 6 on the write surface side toward the electrode 5 on the display surface side. As the charge generation layers 13, 15, layers which generate excitons upon absorption of address light and efficiently separate the excitons into free carriers in the CGL or along an interface between the CGL and the CTL can be used.

The charge generation layers 13, 15 can be generated by a dry process for directly forming a film of a charge generation material (e.g., metal or metal-free phthalocyanine; squalirium compounds; azulenium compounds; perylene pigments; indigo pigments; bis-azo pigments or tris-azo pigments; quinacridone pigments; pyrrolopyrrole dyes; polycyclic quinone pigments; fused aromatic pigments such as dibromo anthrone, and the like; cyanine dyes; xanthene pigments; charge-transfer complexes such as polyvinyl carbazole, nitrofluoren, and the like; and eutectic complexes formed from pyrylium-salt dye and polycarbonate resin); or a wet application method or the like for dispersing or dissolving the charge generation material into an appropriate solvent along with a polymeric binder (e.g., a polyvinyl butyral resin, a polyarylate resin, a polyester resin, a phenol resin, a vinylcarbazole resin, a vinyl formal resin, a partially-denatured vinyl acetal resin, a carbonate resin, an acrylic resin, a vinyl chloride resin, a stylene resin, a vinyl acetate resin, a silicone resin, and the like) to thus prepare a coating fluid, and applying and drying the coating fluid, to thus form a film.

The charge transport layer 14 has the function of being implanted with the photo carriers generated by the charge generation layers 13, 15 and drifting the photo carriers in the direction of an electric field applied according to a bias signal.

The charge transport layer 14 may be efficiently implanted with free carriers originating from the charge generation layers 13, 15 (the charge transport layer 14 may be close to the charge generation layers 13, 15 in terms of ionization potential), and the implanted free carriers can migrate in a hopping manner as fast as possible. In order to increase dark impedance, a lower dark current may be induced by hot carriers.

The charge transport layer 14 is formed by means of dissolving or dispersing a low-molecular positive-hole transport material (e.g., trinitrofluorene-based compounds; polyvinylcarbazole-based compounds; oxadiazole-based compounds; hydrazone-based compounds such as benzylamino-based hydrazone, quinoline-based hydrazone, or the like; stilbene-based compounds, triphenylamine-based compounds, triphenylmethane-based compounds, benzidine-based compounds) or a low-molecular electron transport material (e.g., quinone-based compounds, tetracyanoquinodimethane-based compounds, furfreon compounds, xanthone-based compounds, benzophenone-based compounds) into an appropriate solvent along with a polymeric binder (e.g., a polycarbonate resin, a polyalylate resin, a polyester resin, a polyimide resin, a polyamide resin, a polystyrene resin, a silicon-containing crosslinked resin, and the like), to thus prepare a coating fluid; and applying and drying the coating fluid.

(Coloring Layer)

The coloring layer (the light-shielding layer) 9 is provided for the purpose of optically separating address light from incident light to thus prevent occurrence of malfunction, which would otherwise be caused by mutual interference between the address light and the incident light, and also optically separating external light and display light incident from a non-display surface side of a display medium at the time of display to thus prevent degradation of the picture quality. In the present invention, the coloring layer is not an indispensable constituent element. In order to enhance the performance of the display medium 1', the coloring layer is desirably provided. To this end, the coloring layer 9 is required to have the function of absorbing at least light in an absorption wavelength range of the CGL and light of a reflection wavelength range of the display layer.

Specifically, the coloring layer 9 can be formed by means of a dry method of applying inorganic pigments (e.g., cadmium-based pigments, chromium-based pigments, cobalt-based pigments, manganese-based pigments, carbon-based pigments) or organic dyes or organic pigments (azo-based pigments, anthraquinone-based pigments, indigo-based pigments, triphenylmethane-based pigments, nitro-based pigments, phthalocyanine-based pigments, perylene-based pigments, pyrrolopyrrole-based pigments, quinacridone-based pigments, polycyclic-quinone-based pigments, squarium pigments, azulenium pigments, cyanine-based pigments, pyrylium-based pigments, anthrone-based pigments) directly on the surface of the OPC layer 10 facing the charge generation layer 13, a wet application method of dissolving or dispersing them into an appropriate solvent along with a polymeric binder (e.g., a polyvinyl alcohol resin, a polyacryl resin, and the like), to thus prepare a coating fluid and applying and drying the coating fluid, or the like.

(Laminate Layer)

The laminate layer 8 is a layer intended for playing the role of  absorption and adhesion when each layer formed on the inner surface of each of the upper and lower substrates 3, 4 is adhered. The laminate layer 8 is not an indispensable constituent element in the present invention. The laminate layer is formed from a thermoplastic organic material, a thermosetting organic material, or a combination of them. A material which enables bonding and intimate contact between the display layer 7 and the coloring layer 9 by means of heat and pressure is selected for the laminate layer 8. Another requirement for the laminate layer 8 is to exhibit transmissivity to at least incident light.

An adhesive polymeric material (e.g., polyurethane-based, polypropylene-based, urethane-based, epoxy-based, acrylic-based, silicone-based) can be mentioned as a material suitable for the laminate layer 8.

<Writing Apparatus>

In the present embodiment, the writing apparatus (the apparatus for driving a liquid crystal device) 2' is an apparatus for writing an image on the display medium 1', and comprises, as principal constituent elements, a light irradiation section (an exposure apparatus) 18 for radiating address light to the display medium 1', and a voltage application section (a power supply) 17 for applying a bias voltage to the display medium 1'. Further, the writing apparatus is provided with a control circuit 16' for controlling the operations of the light irradiation section and the voltage application section. Specifically, the writing apparatus 2 of the first embodiment is provided with the light irradiation section 18. The control circuit 16' has the function of controlling the operation of the light irradiation section 18 along with operation of the voltage application section 17, as appropriate. Only the light irradiation section 18, which is a feature of the present embodiment, is described in detail hereunder.

(Light Irradiation Section)

The light irradiation section (the exposure device) 18 may be embodied as any section, so long as the section has the function of radiating a predetermined address light pattern, which forms an image, on the display medium 1', and is able to irradiate a desired optical image pattern (a spectrum, intensity, and a spatial frequency) on the display medium 1' (more specifically, the OPC layer 10) in accordance with an input signal delivered from the control circuit 16.

Light complying with the following conditions can be selected as the address light radiated by the light irradiation section 18.

Spectrum: Higher energy in the absorption wavelength of the OPC layer 10 is desirable. Light having a peak intensity within an absorption wavelength band of the OPC layer 10 and having a narrower bandwidth is preferable.

Radiation Intensity: Intensity at which the voltage applied to the display layer 7 during a bright period is divided by the OPC layer 10 to become higher than a target high voltage V2H, thereby changing the phase of liquid crystal in the display layer 7 from the LH phase to the HH phase, and the voltage applied to the display layer 7 during a dark period is divided by the OPC layer 10 to become the low voltage V2L, thereby keeping the phase of liquid crystal in the display layer 7 to the LH phase.

The following elements are mentioned as the light irradiation section 18.

(1-1) A light source in which a light source (e.g., a cold-cathode tube, a Xenon lamp, a halogen lamp, an LED, an EL, a laser or the like) is arranged in the form of an array, or a light source in which the light source and a polygon mirror are combined together, or the like. The light source can form a given 2-D emission pattern by means of a scanning operation.

(1-2) A uniform light source, such as a light source arranged in the form of an array or a light source combined with a waveguide plate, a combination of light-modulating elements which generate a light pattern (e.g., an LCD, a photomask, and the like).

(2) A self-emitting type display (e.g., a CRT, a PDP, an EL, an LED, an FED, and an SED), such as one in which a light source is arranged in the form of a surface.

(3) A combination of (1-1), (1-2) or (2) with an optical element (e.g., a microlens array, a SELFOC lens array, a prism array, and a view-angle adjustment sheet).

(Control Circuit)

The control circuit 16' is a member having the function of controlling the operation of the voltage application section 17 and the operation of the light irradiation section 18, as required, in accordance with the image data supplied from the outside (an image-capturing device, an image receiver, an image processor, an image reproducing device, a device having a combination of these functions or the like). Specific control operations of the control circuit 16' are embodied by processing pertaining to three steps (operations); namely, (A) an initialization process (operation), (B) a selection process (operation) and (C) a retention process (operation), all of which feature the present invention. Details of these operations will be described later.

(Overall Configuration)

Figure 9:
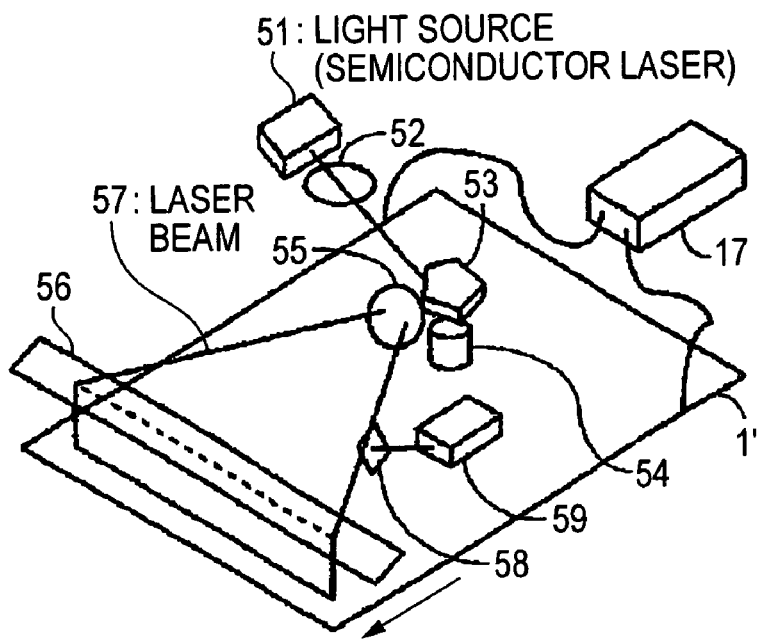
FIG. 9 is a perspective view showing an illustrative embodiment of the apparatus for driving a liquid crystal device 2' according to one aspect of the present invention, which can be supplied in the method of driving a liquid crystal device according to one aspect of the present invention.

FIG. 9 is a perspective view showing an example of the apparatus for driving a liquid crystal device 2' according to the present invention, which can be supplied in the method of driving a liquid crystal device according to the present invention. FIG. 9 shows a case where a laser is utilized in the exposure device. In addition, in this drawing, the control circuit 16' is omitted.

An exposure optical system employs a semiconductor laser as a light source 51, and comprises a collimate lens 52, a polygon mirror 53, a polygon motor 54, a f-θ lens 55, a folding mirror 56 and the like. A laser beam 57 is sent to a sync signal generator 59 via a beam adjustment mirror 58 and is used for synchronization of a scanning timing. Though not shown in the drawing, a controller of the exposure device is the same as that of a laser exposure device for a common electronic photo.

Transfer of the display medium (a liquid crystal device) 1' in a sub-scanning direction (in the direction of an arrow in FIG. 9) may be performed by means of a pulse motor with the display medium 1' being fixed in the form of a plane, as shown in the drawing, or by means of a method of rotating the display medium 1 using a motor by forming the substrate of the display medium 1' in the form of a film in a state where the display medium 1 is made flexible and fixed to a cylindrical drum.

Figure 10:
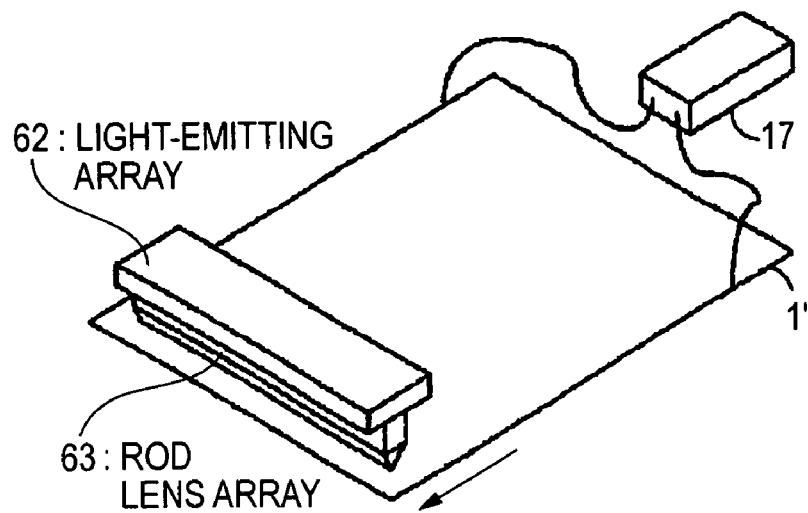
FIG. 10 illustrates another embodiment of the writing apparatus (the apparatus for driving a liquid crystal device) 2' according to one aspect of the present invention, which can be supplied in the method of driving a liquid crystal device according to one aspect of the present invention.

FIG. 10 illustrates another example of the writing apparatus (the apparatus for driving a liquid crystal device) 2' according to the present invention, which can be supplied in the method of driving a liquid crystal device according to the present invention. FIG. 10 shows a case where a light-emitting diode array is utilized in the exposure device. The writing apparatus shown in FIG. 10 is the same as that of FIG. 9 except that an exposure light source comprises a light-emitting diode array 62 and a self-image forming rod lens array 63.

<Operation>

A method of driving a liquid crystal device and operation (manipulation) of an apparatus for driving a liquid crystal device according to the present invention will be described in detail hereunder by reference to the apparatus for driving a liquid crystal device according to the present embodiment illustrated in FIG. 8.

In the display medium 1' of the present embodiment, voltage applied to the display layer 7 differs from that applied between the pair of electrodes 5,6 as much as the OPC layer 10, etc. are laminated, unlike the display medium 1 of the first embodiment.

Figure 11:
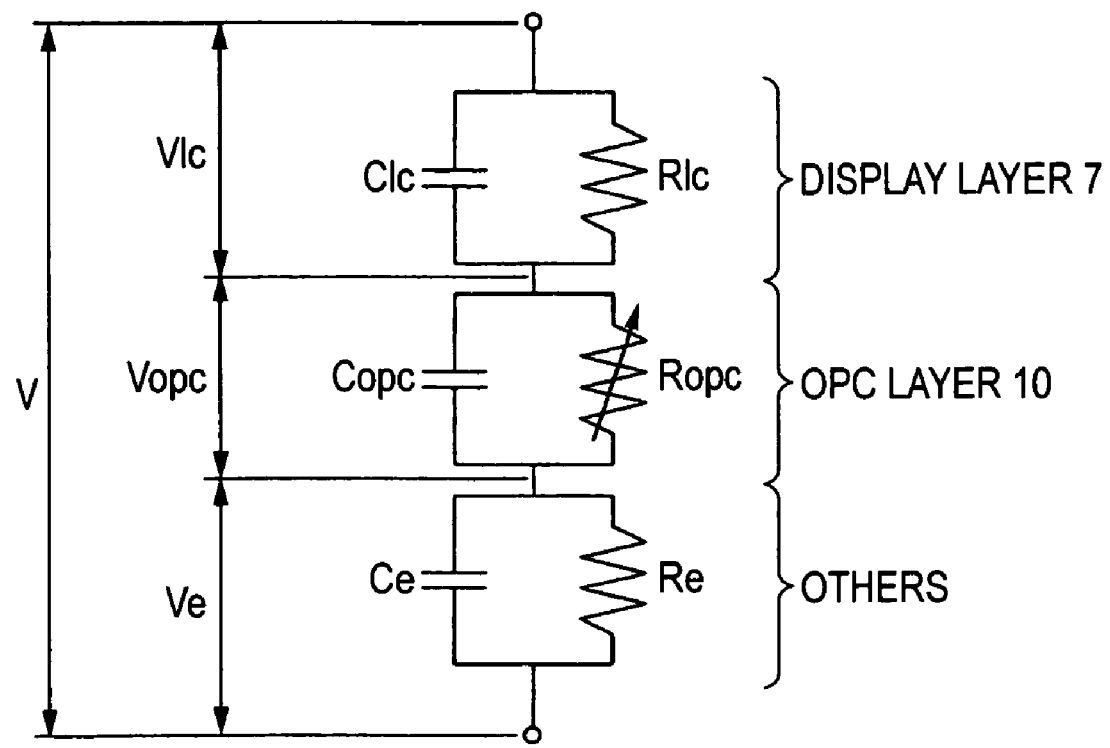
FIG. 11 is an equivalent circuit diagram of a display medium (liquid crystal device) of the structure illustrated in FIG. 8.

FIG. 11 is an equivalent circuit diagram of the display medium (a liquid crystal device) 1' of the structure shown in FIG. 8. Clc and Copc designate a capacitance and resistance value of the display layer 7, respectively, and Rlc and Ropc designate a capacitance and resistance value of the OPC layer 10, respectively. Ce and Re designate an equivalent capacitance and equivalent resistance value of a constituent element other than the display layer 7 and the OPC layer 10.

When voltage applied between the electrode 5—the electrode 6 of the display medium 1 from an external writing apparatus 2' is V, divided voltages Vlc, Vopc and Ve which are decided in accordance with the impedance ratio between respective constituent elements are applied to the respective constituent elements. More specifically, immediately after voltage is applied, a divided voltage decided according to the capacitance ratio of each constituent element is generated, and is mitigated to a divided voltage decided as a resistance value ratio of each constituent element as time goes by.

In this case, the resistance value Ropc of the OPC layer 10 changes depending on the intensity of address light. Thus, a valid voltage applied to the display layer 7 can be controlled by means of exposure and non-exposure. At the time of exposure, the resistance value Ropc of the OPC layer 10 becomes small, and a valid voltage applied to the display layer 7 becomes great. In contrast, at the time of non-exposure, the resistance value Ropc of the OPC layer 10 becomes great, and a valid voltage applied to the display layer 7 becomes small.

As described above, in the display medium 1' of the present embodiment, the voltage V applied between the pair of electrodes 5, 6 differs from the voltage (divided voltage) Vlc applied to the display layer 7 upon exposure as well as non-exposure. Thus, to realize the method of driving a liquid crystal device of the present invention, it is necessary to pay attention to the voltage (divided voltage) Vlc applied to the display layer 7. Description will be given assuming it by reference to FIG. 7 as in the case of the first embodiment.

In addition, with respect to the scan type optical address type liquid crystal device shown in FIG. 8, a bias voltage applied between the pair of electrodes 5, 6 in each process becomes constant. Therefore, it is assumed that in subsequent description, voltages V1', V2' and V3' applied between the pair of electrodes 5,6 in each process are identical except for an example using a two-dimensional batch exposure device in the writing apparatus.

As shown in FIG. 7, in the preparation period, a bias voltage V1', which is controlled so that a bias voltage V1 of an AC pulse waveform is applied to the display layer 7, is applied between the pair of electrodes 5, 6 by means of the voltage application section 17 from a pre-display state, namely, a state where the bias voltage is not applied.

In the preparation period, the bias voltage V1 higher than a threshold value of a phase change to the homeotropic phase is applied. Accordingly, the cholesteric liquid crystals 12 within the display layer 7 all become the homeotropic phase, as shown in FIG. 7. The homeotropic phase in this process is the above-described low-order homeotropic phase LH.

In the writing period, actual writing is performed (the selection process (B)). More specifically, while a voltage V2' higher than the voltage V1' is applied between the pair of electrodes 5, 6 by means of the voltage application section 17, address light P2 is selectively radiated, as appropriate, by means of the light irradiation section (an exposure device) 18. Thus, the address light P2 is selected depending on a portion such that a lower voltage V2L higher than the voltage V1 is applied to a portion not irradiated with the address light P2 and a high voltage V2H higher than the low voltage V2L is applied to a portion irradiated with the address light P2.

In each portion, radiation/non-radiation of the address light P2 are selected, thus the phase of the portion (a bright part) irradiated with the address light P2 changes from the LH phase to the HH phase and the phase of the portion (a dark part) irradiated with the address light P2 is kept to the LH phase.

Furthermore, as mentioned above, the writing period adopts a change from the low-order homeotropic phase LH to the high-order homeotropic phase HH, wherein a phase change speed is very fast in the present invention. Accordingly, time can be saved significantly compared with the prior art.

Finally, in the retention period, the state changes to the liquid crystal state in which an image is actually formed (the retention process (C)). It is presumed that the LH phase and the HH phase have a relationship of hysteresis in a subsequent transitional phase, and therefore a latent image in which other orientation states exist together is formed based on the HH phase and the LH phase. In this case, a bias voltage V3', which is controlled under the conditions of the magnitude and application time of voltage in which the phase of a portion (a bright portion) which has been selected so that the high voltage V2H is applied in the writing period changes to the planar phase P in the end, and the phase of a portion (a dark portion) which has been selected so that the low voltage V2L is applied in the writing period changes to the focal conic phase F in the end, is applied between the pair of electrodes 5,6 by means of the voltage application section 17 in the retention period. Thus, a display image comprising the planar phase P that transmits light and the focal conic phase F that reflects light, depending on the existence and non-existence of radiation of address light, which is selected in the writing period, is formed.

The concept of a principle in which the low-order homeotropic phase LH of the portion in which the low voltage V2L has been selected changes to the selective transmission state of the focal conic phase F via the retention period, and a principle in which the high-order homeotropic phase HH of the portion in which the high voltage V2H has been selected changes to the selective reflection state of the planar phase P via the retention period is the same as that described in the first embodiment.

The above operations are sequentially performed, so that each portion (pixel) of the display layer can become the reflection state or the transmission state depending on selection of radiation/non-radiation of the address light in the writing period (the selection process (B)). The liquid crystal state is selected as described above, and writing (actuation) on the liquid crystal device is performed accordingly.

However, in the display medium (the liquid crystal device) 1' in which optical address is possible, which is illustrated in the present embodiment, not the voltage applied between the pair of electrodes 5, 6, but the voltage (divided voltage) applied to the display layer 7 may be set to a given voltage defined in each process. Thus, in the event that writing is performed using the two-dimensional batch exposure device as the writing apparatus, the conditions of the applied voltage or radiation of the address light can be changed as below in each period described in the present embodiment.

<Preparation Period (Initialization Process (A))>

In the description about the operation, in the preparation period, address light can be radiated along with application of voltage.

This will be described by reference to FIG. 7. While a voltage V1" is applied between the pair of electrodes 5, 6 by means of the voltage application section 17 by controlling the magnitude of voltage and the light intensity of address light such that the bias voltage V1 of the AC pulse waveform is applied to the display layer 7, the address light P1 is radiated to the whole surface by means of the light irradiation section (the exposure device) 18.

As described above, in the preparation period ((A) the initialization process•operation), control may be performed so that a given bias voltage V1 is applied to the display layer 7 even if the address light is radiated as well as application of voltage.

<Writing Period (Selection Process (B))>

In the description about the operation, in the writing period, writing can be performed by selecting the intensity (high and low) of the light intensity of address light, while the address light is continuously radiated, regardless of whether the address light is radiated or not.

This will be described by reference to FIG. 7. While a voltage V2'higher than the voltage V1' is applied between the pair of electrodes 5, 6 by means of the voltage application section 17, address light P2H and P2L having different light intensities are selectively radiated by means of the light irradiation section (an exposure device) 18 depending on a portion. Thus, the address light P2H and P2L are selected according to a portion such that the lower voltage V2L higher than the voltage V1 is applied to a portion of the display layer 7 irradiated with the address light P2L of a lower light intensity, and the higher voltage V2H higher than the lower voltage V2L is applied to a portion of the display layer 7 irradiated with the address light P2H of a higher light intensity.

As described above, in the writing period (the selection process (B)), control may be performed so that a given low voltage V2L and a given high voltage V2H are selectively applied to the display layer 7 by selecting the intensity (high or low) of the light intensity of address light even if the address light has been radiated to the entire portions.

<Retention Period (Retention Process (C))>

In the description about the operation, in the retention period, address light may be radiated while voltage is applied.

This will be described by reference to FIG. 7. While a bias voltage V3" is applied between the pair of electrodes 5,6 by means of the voltage application section 17 using the magnitude of voltage, an application time of voltage, and the light intensity of address light, which are controlled under the conditions that the phase of a portion (i.e., a bright section) of the display layer 7, which has been selected such that the higher voltage V2H is applied in the writing period, finally changes to the planar phase P, and that the phase of a portion (i.e., a dark section) of the display layer 7, which has been selected such that the lower voltage V2L is applied in the writing period, finally changes to the focal conic phase F, the address light P3 is radiated to the whole surface by means of the light irradiation section 18.

As described above, in the retention period (the retention process (C)), control may be performed so that a given bias voltage V3" is applied to the display layer 7 even if the address light is radiated as well as application of voltage.

The present invention has been described above in connection with the embodiments. However, the present invention is not limited to the above embodiments. Furthermore, those skilled in the art can alter the present invention, as appropriate, the present invention in accordance with related-art, publicly-known knowledge. As a matter of course, any modifications fall within the scope of the present invention, so long as the modifications are equipped with the configuration of the present invention even after alterations have been made.

EXAMPLE

Hereinafter, the present invention will be described in more detail in connection with an example. The present invention is not limited to the following embodiment.

A liquid crystal device applicable to the present invention is the display medium 1 (additionally equipped with the light-blocking layer) shown in FIG. 6. An image is written using the method of driving a liquid crystal device and the apparatus for driving a liquid crystal device according to the present invention and a comparison example. This will be described with reference to FIGS. 6 and 7.

There was prepared, as Cholesteric liquid crystal, a material that selectively reflects the green by mixing nematic liquid crystal (Merck & Co., Inc. No. E7) of 77.5 weight %, dextrorotatory chiral agent (Merck & Co., Inc. No. CB15) of 18.8 weight % and dextrorotatory chiral agent (Merck & Co., Inc. No. R1011) of 3.7 weight %.

There were prepared two sheets of glass substrates (Corning Co., Ltd. No. 7059) having one surface ITO sputtered with (surface resistance 30Ω/□) and having a thickness of 1.1 mm. A polyvinyl alcohol aqueous solution in which carbon black pigments had been dispersed was spin-coated on the exterior surface (a surface on which ITO had not been formed) of one of the two sheets of glass substrates, thereby growing a 2 μm-thick light-blocking layer (not shown). A liquid crystal vertical orientation layer (NISSAN CHEMICAL INDUSTRIES, LTD. No. SE7511L) was coated on the ITO film by means of a spin-coat method so that a dried film thickness becomes 10 nm in thickness. Regarding the display medium 1 shown in FIG. 6, the glass substrate is the substrate 4 and the ITO film is the electrode 6.

A liquid crystal vertical orientation layer (NISSAN CHEMICAL INDUSTRIES, LTD. No. SE7511L) was coated on the other of the two sheets of glass substrates on which the ITO film had been formed by means of a spin-coat method so that a dry film thickness becomes 10 nm in thickness. A spherical spacer (Sekisui Fine Chemical Co., Ltd. No. SP210) of 10 μm in diameter was coated on the liquid crystal vertical orientation layer. In addition, the glass substrate becomes the substrate 3 and the ITO film becomes the electrode 5. Optical adhesives (Noland Co. No. NOA65) were drawn on the peripheral portions of the glass substrate by means of a dispenser. The glass substrate (the substrate 4) of the other side was adhered to the peripheral portions of the glass substrate so that a surface of the ITO film (the electrode 6) was directed toward the surface on which the spherical spacer had been sprayed. Accordingly, the optical adhesives was optically adhered so that an empty cell was produced.

Cholesteric liquid crystal of the obtain green was injected into the empty cell through a capillary tube, thus forming the display layer 7 between the ITO films (between the pair of electrodes 5, 6). The display medium 1 was thereby completed.

(Determine Conditions of Initialization Process (A))

In the obtained display medium 1, a waveform generator (BIOMATION CO. No. 2714A) whose GPIB is controlled by a personal computer was connected to a control section (the control circuit 16), and the writing apparatus 2 employing a high pressure power supply (Matsusada Precision Inc. No. HEOPT-1B60) as the voltage application section 17.

Figure 12:
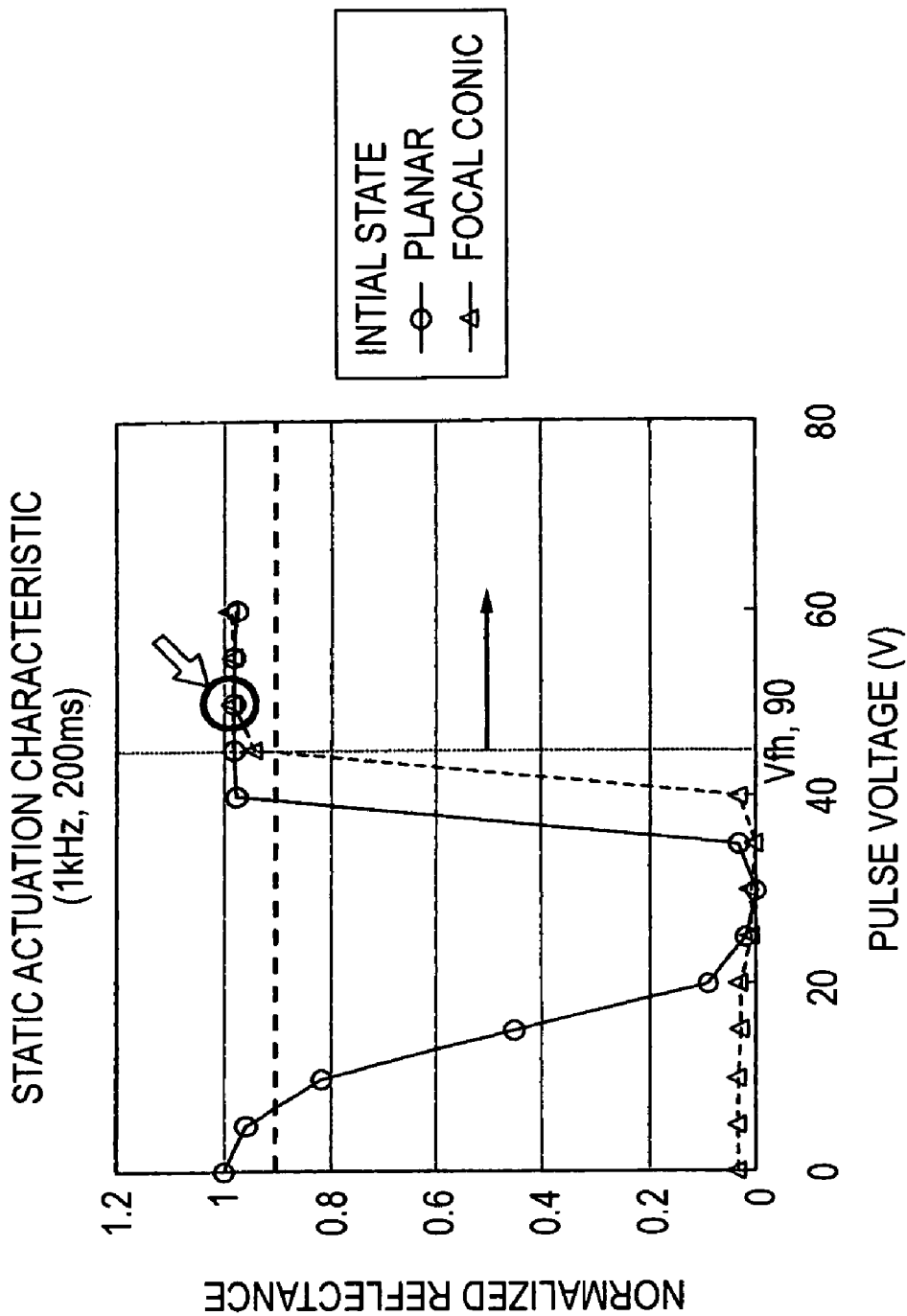
FIG. 12 is a graph showing variation in the normalized reflectance where a planar phase and a focal conic phase are an initial state in the display medium of an embodiment of the structure illustrated in FIG. 8.

A square wave of 1 kHz was applied with 200 ms from the writing apparatus 2 to the display medium 1. Thereafter, reflectance of the display medium 1 when an applied voltage was applied was measured by means of an integral square spectrum photometer (Konica Minolta Holdings, Inc. NO. CM2022). A change in the normalized reflectance in which the planar phase and the focal conic phase are set to an initial state (a static actuation characteristic) is shown in FIG. 12. The normalized reflectance refers to normalization of luminous reflectance Y in which the highest value is 1 and the lowest value is 0.

In addition, in the graph of FIG. 12, in the case where the initial state is the planar phase or the focal conic phase, if the applied voltage becomes high by some degree, the normalized reflectance becomes close to 1. This means that after the applied voltage was released, the phase has changed to the planar phase, and before the applied voltage was released, the phase has changed to the homeotropic phase.

From the graph of FIG. 12, it can be seen that a case where the focal conic phase is the initial state has a high threshold value changing to the homeotropic phase, and therefore if a voltage of 44 V or more corresponding to Vfh90 is applied with no regard to the initial state, the phase changes to the homeotropic phase.

From the above experiment result, the bias voltage V1 in the initialization process (the preparation period) in which the phase LH (the low-order homeotropic phase) is selected is set to 50 V considering margin.

(Determine Conditions of Selection Process (B) and Retention Process (C))

Driving conditions of the selection process (B) (the writing period) and the retention process (the retention period) (C) influence each other. Thus, optimal conditions were selected by performing an orthogonal experiment while varying parameters of the two processes. Only results when the process of one of the selection process (B) and the retention process (C) is optimized are illustrated in description below so that the graph is not complicated.

Figure 13:
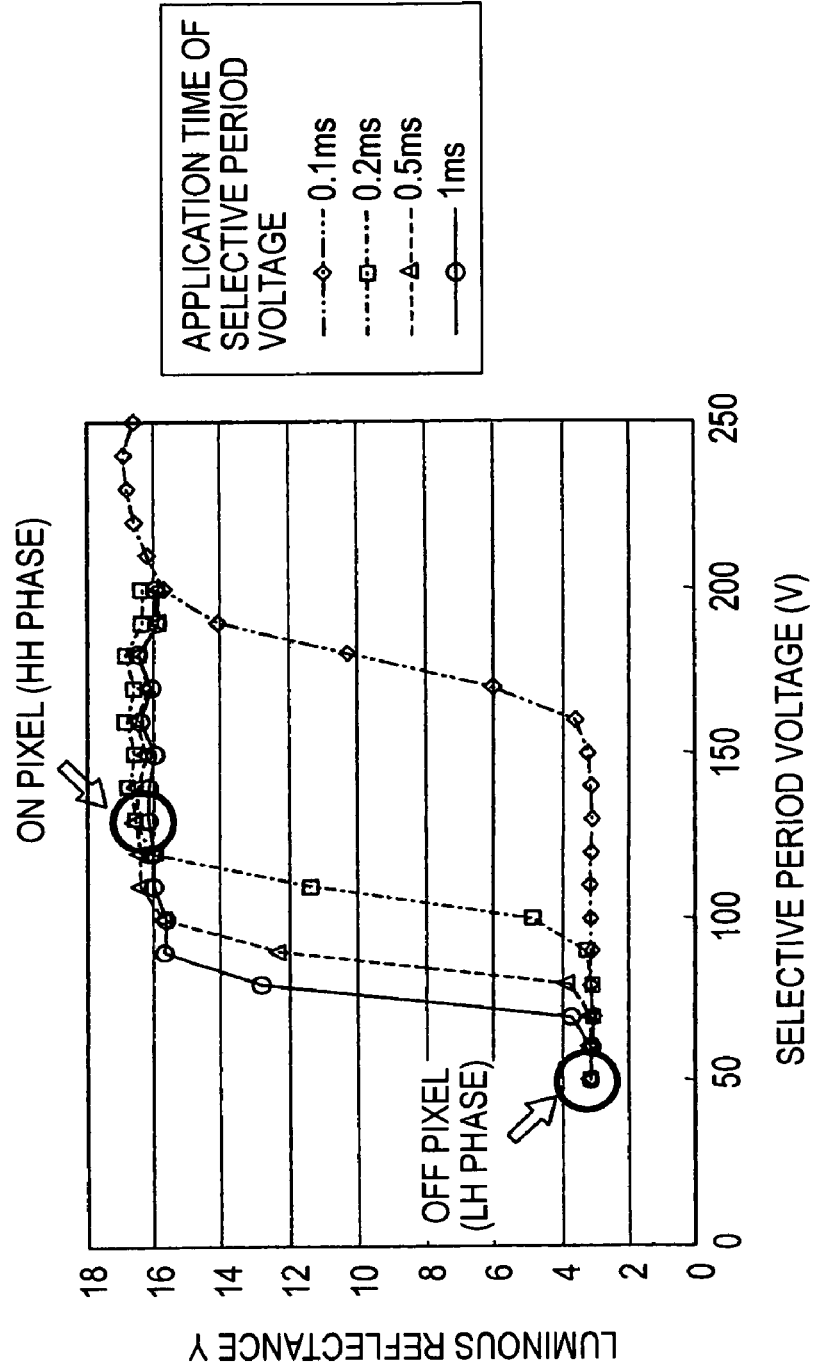
FIG. 13 is a graph showing the influence of a retention voltage on the contrast ratio of a final display medium when an initialization voltage and a selection period voltage have a given value in the display medium of an embodiment of the structure illustrated in FIG. 8.

FIG. 13 is a graph showing the influence of driving conditions (a voltage, an application time) on the luminous reflectance Y of the final display medium 1 when a voltage (an initialization voltage V1)=50 V in (A) the initialization process and a voltage (a retention voltage) V3=22.5 V in (C) the retention process.

In this case, the luminous reflectance Y of the longitudinal axis indicates a value measured by the above-mentioned apparatus with respect to an image finally displayed on the surface of the display medium 1 when the conditions of each process before and after the selection process are set as described above. The focal conic phase has a value of about 3 (OFF state in pixel), and the planar phase has a value of about 16 to 17 (ON state in pixel).

Thus, in the state of the selection period voltage 50 V when the selection process begins, liquid crystal is kept to the low-order homeotropic phase LH even if the application time is long. If a voltage (the selection period voltage) and an application time thereof (the selection period voltage application time) in the selection process increase, the phase of the liquid crystal changes to the high-order homeotropic phase HH, resulting in the conditions of the ON pixel state. It can be said that the graph of FIG. 13 is a graph intended for finding out corresponding conditions.

As the voltage application time is shortened in the selection period, the voltage V2H that selects the ON pixel is increased. From the result of the graph of FIG. 13, it can be seen that even when the selection process voltage application time (i.e., the shortest time of the experimental conditions) is 0.1 ms, the ON pixel can be selected. In the present embodiment, the voltage application in the selection process time was set to 0.2 ms by taking an operating voltage range into consideration, and in the selection process, a driving voltage (a high voltage) V2H that selects the HH phase was set to 130 V and a driving voltage (a low voltage) V2L that selects the LH phase was set to 50 V.

Figure 14:
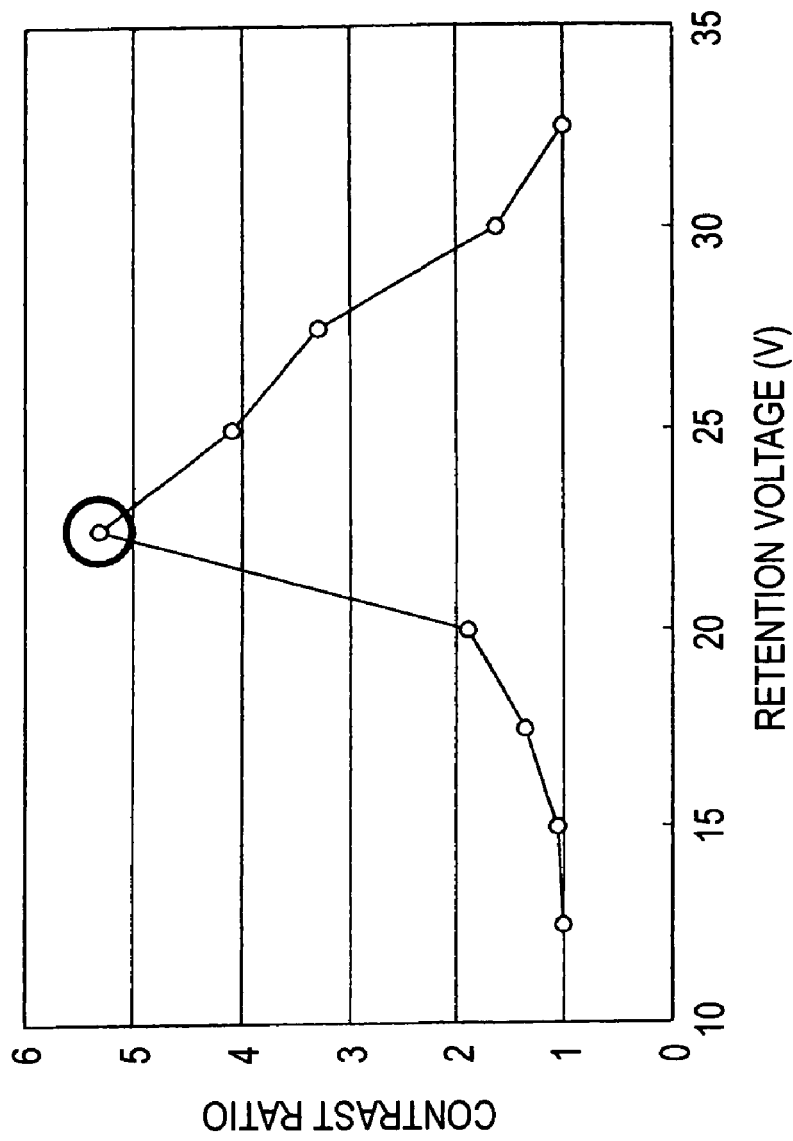
FIG. 14 is a graph showing the influence of driving conditions in a selection process on the luminous reflectance Y of a final display medium when an initialization voltage and a retention voltage have a given value in the display medium of an embodiment of the structure illustrated in FIG. 8.

Meanwhile, FIG. 14 is a graph showing the influence of a voltage (a retention voltage) of the retention process on the contrast ratio (time-decreasing reflectance of a bright portion and a dark portion of an image) of the final display medium 1 when the initialization voltage V1=50 V, the high voltage V2H=130V·the low voltage V2L=50V in the selection period voltage, and an application time thereof was set to 0.2 ms. Furthermore, the voltage application time of the retention period was 100 ms and the frequency was 1 kHz. The contrast ratio with respect to the retention voltage had an extreme value, and in the present embodiment, 22.5 V indicating the highest contrast 5.3 was the retention voltage V3.

Figure 15:
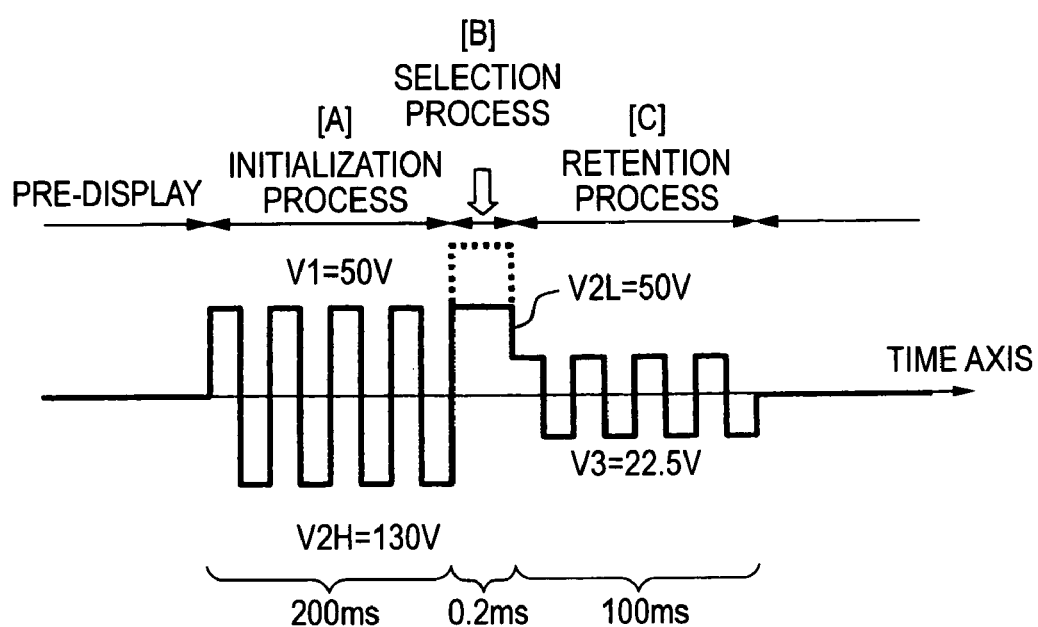
FIG. 15 is a chart diagrammatically showing, in time series, driving conditions in each process, which are acquired in an embodiment in the display medium of an embodiment of the structure illustrated in FIG. 8.

Optimal driving conditions determined in the above experiment are indicated in Table 1 below and FIG. 15.

TABLE 1

|  | (A) Initialization Period | (B) Selection Period | | (C) Retention Period |
| --- | --- | --- | --- | --- |
|  |  | ON pixel | OFF pixel |  |
| Voltage (V) | 50 | 130 | 50 | 22.5 |
| Time (ms) | 200 | 0.2 | | 100 |
| Frequency (Hz) | 1000 | DC | | 1000 |

When the display medium 1 was driven under the above conditions, on/off of each pixel was controlled clearly. From the result of the present embodiment, it can be seen that since the selection process of controlling on/off of an image is finished within a short period of time, the rewrite speed of an image can become very high although a display medium consists of a large number of scan lines.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A method for driving a liquid crystal device to record an image on the liquid crystal device, the liquid crystal device including a pair of electrodes, a liquid crystal layer containing a cholesteric liquid crystal, and a photoconductive layer, the liquid crystal layer and the photoconductive layer being sandwiched between the pair of electrodes, the method comprising:

performing at least one of:
applying a voltage V1' between the pair of electrodes; and
applying a voltage V1" between the pair of electrodes while irradiating the liquid crystal device with address light P1, so as to make the liquid crystal layer to be in a homeotropic phase;

performing at least one of:
applying a voltage higher than the voltage V1' between the pair of electrodes while irradiating selectively the liquid crystal device with address light P2 so that a voltage V2L higher than the voltage V1 is applied to a portion of the liquid crystal layer not irradiated with the address light P2 and a voltage V2H higher than the voltage V2L is applied to a portion of the liquid crystal layer irradiated with the address light P2; and
irradiating selectively each portion of the liquid crystal layer with one of address light P2H and P2L so that the voltage V2L is applied to a portion of the liquid crystal layer irradiated with the address light P2L and the voltage V2H is applied to a portion of the liquid crystal layer irradiated with the address light P2H; and performing at least one of:
applying a voltage V3' between the pair of electrodes under a condition of such a magnification and application time of the voltage V3' that a phase of a portion to which the voltage V2H has been applied changes to a planar phase and a phase of a portion to which the voltage V2L has been applied changes to a focal conic phase; and
applying a voltage V3" between the pair of electrodes while irradiating the liquid crystal layer with address light P3 under a condition of such a magnification and application time of the voltage V3' and a light intensity of the address light P3 that the phase of the portion to which the voltage V2H has been applied changes to a planar phase and the phase of the portion to which the voltage V2L has been applied changes to a focal conic phase, so as to record the image.

2. The method according to claim 1, wherein the irradiating the liquid crystal device with the address light is performed by exposing the liquid crystal device to the address light while scanning the liquid crystal device in one dimension.

3. The method according to claim 1, wherein the irradiating the liquid crystal device with the address light is performed by exposing the liquid crystal device to the address light while scanning the liquid crystal device in two dimensions.

4. The method according to claim 2, wherein a laser light is employed as a device emitting the address light.

5. The method according to claim 3, wherein a laser light is employed as a device emitting the address light.

6. The method according to claim 2, wherein a light-emitting diode array is employed as a device emitting the address light.

7. The method according to claim 3, wherein a light-emitting diode array is employed as a device emitting the address light.

8. An apparatus for driving a liquid crystal device to record an image on the liquid crystal device, the liquid crystal device including a pair of electrodes, and a liquid crystal layer sandwiched between the pair of electrodes, the liquid crystal layer containing a cholesteric liquid crystal, the apparatus comprising:

a power supply capable of applying a voltage between the pair of electrodes, the apparatus being configured to sequentially perform:
an initialization operation of applying a voltage V1 between the pair of electrodes by means of the power supply to make the liquid crystal layer to be in a homeotropic phase, the voltage V1 being higher than a threshold value of a phase change to the homeotropic phase in the liquid crystal layer,
a selection operation of applying selectively one of two voltages V2H and V2L to each portion of the liquid crystal layer by means of the power supply, the two voltages V2H and V2L being higher than the voltage V1, the voltage V2H being higher than the voltage V2L; and
a retention operation of applying a voltage V3 between the pair of electrodes by means of the power supply under a condition of such a magnification and application time of the voltage V3 that a phase of a portion to which the voltage V2H has been applied changes to a planar phase and a phase of a portion to which the voltage V2L has been applied changes to a focal conic phase.

9. An apparatus for driving a liquid crystal device to record an image on the liquid crystal device, the liquid crystal device including a pair of electrodes, a liquid crystal layer containing a cholesteric liquid crystal, and a photoconductive layer, the liquid crystal layer and the photoconductive layer being sandwiched between the pair of electrodes, the apparatus comprising:

a power supply capable of applying a voltage between the pair of electrodes; and an exposure device capable of irradiating the liquid crystal device with address light, the apparatus being configured to sequentially perform:
an initialization operation of performing at least one of:
applying a voltage V1' between the pair of electrodes; and
applying a voltage V1" between the pair of electrodes while irradiating the liquid crystal device with address light P1, so as to make the liquid crystal layer to be in a homeotropic phase;
a selection operation of performing at least one of:
applying a voltage higher than the voltage V1' between the pair of electrodes while irradiating selectively the liquid crystal device with address light P2 so that a voltage V2L higher than the voltage V1 is applied to a portion of the liquid crystal layer not irradiated with the address light P2 and a voltage V2H higher than the voltage V2L is applied to a portion of the liquid crystal layer irradiated with the address light P2; and
irradiating selectively each portion of the liquid crystal layer with one of address light P2H and P2L so that the voltage V2L is applied to a portion of the liquid crystal layer irradiated with the address light P2L and the voltage V2H is applied to a portion of the liquid crystal layer irradiated with the address light P2H; and
a retention operation of performing at least one of:
applying a voltage V3' between the pair of electrodes under a condition of such a magnification and application time of the voltage V3' that a phase of a portion to which the voltage V2H has been applied changes to a planar phase and a phase of a portion to which the voltage V2L has been applied changes to a focal conic phase; and
applying a voltage V3" between the pair of electrodes while irradiating the liquid crystal layer with address light P3 under a condition of such a magnification and application time of the voltage V3' and a light intensity of the address light P3 that the phase of the portion to which the voltage V2H has been applied changes to a planar phase and the phase of the portion to which the voltage V2L has been applied changes to a focal conic phase, so as to record the image.

10. The apparatus according to claim 9, wherein the exposure device is a device for exposing the liquid crystal device while scanning the liquid crystal device in one dimension.

11. The apparatus according to claim 9, wherein the exposure device is a device for exposing the liquid crystal device while scanning the liquid crystal device in two dimensions.

12. The apparatus according to claim 10, wherein the exposure device is an exposure device emitting laser light.

13. The apparatus according to claim 11, wherein the exposure device is an exposure device emitting laser light.

14. The apparatus according to claim 10, wherein the exposure device comprises a light-emitting diode array.

15. The apparatus according to claim 11, wherein the exposure device comprises a light-emitting diode array.

* * * * *